(12) United States Patent
Xue et al.

(10) Patent No.: US 12,413,600 B2
(45) Date of Patent: Sep. 9, 2025

(54) METHOD, APPARATUS, SYSTEM, DEVICE, AND STORAGE MEDIUM FOR IMPLEMENTING TERMINAL VERIFICATION

(71) Applicant: Huawei Technologies Co., Ltd., Shenzhen (CN)

(72) Inventors: Li Xue, Nanjing (CN); Weiwang Xu, Nanjing (CN); Chao Sun, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 18/154,263

(22) Filed: Jan. 13, 2023

(65) Prior Publication Data

US 2023/0171264 A1    Jun. 1, 2023

Related U.S. Application Data

(63) Continuation of application No. PCT/CN2021/105494, filed on Jul. 9, 2021.

(30) Foreign Application Priority Data

Jul. 13, 2020  (CN) .......................... 202010669766.4
Oct. 31, 2020  (CN) .......................... 202011198953.5

(51) Int. Cl.
*H04L 9/40*    (2022.01)
*H04L 5/00*    (2006.01)

(52) U.S. Cl.
CPC .......... *H04L 63/126* (2013.01); *H04L 5/0044* (2013.01); *H04L 63/08* (2013.01)

(58) Field of Classification Search
CPC ...... H04L 63/126; H04L 63/08; H04L 5/0044
USPC .......................................................... 726/5
See application file for complete search history.

(56) References Cited

U.S. PATENT DOCUMENTS

2010/0299725 A1   11/2010  Yamada
2015/0172289 A1*   6/2015  Kwon ................. H04W 12/122
                                            726/3

FOREIGN PATENT DOCUMENTS

| CN | 104410982 A | 3/2015 |
| CN | 108683901 A | 10/2018 |
| CN | 110769008 A | 2/2020 |
| CN | 111325451 A | 6/2020 |
| EP | 3442191 A1 | 2/2019 |
| JP | 2006155045 A | 6/2006 |
| WO | 03088532 A1 | 10/2003 |

* cited by examiner

*Primary Examiner* — Michael S McNally
(74) *Attorney, Agent, or Firm* — Slater Matsil, LLP

(57) ABSTRACT

A method, an apparatus, a system, a device, and a storage medium for implementing terminal verification are provided. In this method, a transmission feature of a terminal is reconstructed to verify the terminal. For example, if a difference between the transmission feature obtained through reconstruction and the transmission feature of the terminal is relatively large, it indicates that the transmission feature of the terminal is abnormal, and the terminal is an abnormal terminal. In this case, it is determined that the verification of the terminal fails.

18 Claims, 11 Drawing Sheets

METHOD, APPARATUS, SYSTEM, DEVICE, AND STORAGE MEDIUM FOR IMPLEMENTING TERMINAL VERIFICATION

CROSS-REFERENCE TO RELATED APPLICATIONS

This application is a continuation of International Application No. PCT/CN2021/105494, filed on Jul. 9, 2021, which claims priority to Chinese Patent Application No. 202011198953.5, filed on Oct. 31, 2020, and Chinese Patent Application No. 202010669766.4, filed on Jul. 13, 2020. All of the aforementioned patent applications are hereby incorporated by reference in their entireties.

TECHNICAL FIELD

This application relates to the field of communications technologies, and in particular, to a method, an apparatus, a system, a device, and a storage medium for implementing terminal verification.

BACKGROUND

In industries such as smart parks, higher education, manufacturing, and finance, there are often cases of illegal access to servers by abnormal terminals. There are many types of abnormal terminals, and spoofing terminals are used as an example. Increasingly more internet of things (IoT) terminals support network access functions. Compared with intelligent terminals (such as computers, tablets, and mobile phones), the IoT terminals have weak security protection functions and are easily to be spoofed. To avoid potential security risks caused by the spoofing terminals, network devices usually verify IoT terminals accessing the network devices to determine whether the IoT terminals are spoofing terminals.

Currently, a terminal verification process is usually as follows: After receiving a data stream output by an IoT terminal, a network device extracts an internet protocol (IP) address of the IoT terminal from a packet in the data stream and queries an IP address database. If the IP address database stores the IP address of the IoT terminal, the network device determines that the IoT terminal is not a spoofing terminal, and verification of the IoT terminal succeeds. If the IP address database does not store the IP address of the IoT terminal, the network device determines that the IoT terminal is a spoofing terminal, and verification of the IoT terminal fails.

Because the IP address of the IoT terminal is easily to be spoofed, if the spoofing terminal outputs a data stream to the network device by spoofing an IP address in the IP address database, the IP address extracted by the network device from the data stream output by the spoofing terminal is the IP address in the IP address database. In this case, the verification of the spoofing terminal performed by the network device succeeds. It can be learned that the network device cannot accurately find the spoofing terminal through verification in the foregoing terminal verification process, that is, the accuracy of the terminal verification is low.

SUMMARY

This application provides a method, an apparatus, a system, a device, and a storage medium for implementing terminal verification, to improve accuracy of terminal verification. The technical solution is as follows:

According to a first aspect, a method for implementing terminal verification is provided. The method includes: obtaining a first transmission feature of a first terminal; reconstructing the first transmission feature based on the first transmission feature to obtain a second transmission feature; and determining, if a difference between the first transmission feature and the second transmission feature is greater than or equal to a target difference, that verification of the first terminal fails, where the first transmission feature is an overall transmission feature of at least one first data stream transmitted by the first terminal, and the second transmission feature is the reconstructed first transmission feature.

It should be noted that, reconstructing refers to restructuring, and the reconstructing the first transmission feature based on the first transmission feature means that obtaining the second transmission feature through reconstruction based on the first transmission feature by using a preset algorithm, where the second transmission feature obtained through reconstruction is as consistent as possible with the first transmission feature.

The preset algorithm is used to reconstruct a normal transmission feature as much as possible, and the preset algorithm includes dimension reduction encoding and dimension increase decoding. The dimension reduction encoding is an encoding manner for reducing a dimension of a transmission feature, and the dimension increase encoding is an encoding manner for increasing a dimension of a transmission feature. Optionally, the reconstructing the first transmission feature based on the first transmission feature includes: performing dimension reduction encoding on the first transmission feature, and performing dimension increase decoding on the first transmission feature after the dimension reduction encoding. Optionally, the preset algorithm is expressed by the following target model.

In this method, a transmission feature of a terminal is reconstructed to verify the terminal. For example, if a difference between the transmission feature obtained through reconstruction and the transmission feature of the terminal is relatively large, it indicates that the transmission feature of the terminal is abnormal, and the terminal is an abnormal terminal. In this case, it is determined that the verification of the terminal fails. Because the terminal has a specific normal transmission feature, and the normal transmission feature is not easily spoofed, in this method, various of abnormal terminals can be accurately found through verification, thereby improving accuracy of terminal verification. In addition, because a spoofing terminal is one type of abnormal terminal, in this method, the spoofing terminal can also be accurately found through verification without using a manner in which an IP address of the terminal is simply verified, to prevent the verification of the spoofing terminal from succeeding.

It should be noted that a transmission feature of a normal terminal is the normal transmission feature of the terminal, and a transmission feature of an abnormal terminal is the abnormal transmission feature of the terminal.

In a possible implementation, the first transmission feature includes an uplink transmission feature, and the uplink transmission feature is an overall transmission feature of at least one uplink data stream in the at least one first data stream.

In a possible implementation, the uplink transmission feature includes at least one of an uplink packet feature and an uplink stream feature; and the uplink packet feature is an overall feature of uplink packets in the at least one uplink data stream, and the uplink stream feature is a statistical feature of the at least one uplink data stream.

In a possible implementation, the uplink packet feature includes at least one of an average transmission interval of uplink packets, an average uplink payload size, a total uplink payload size, a quantity of uplink packets, a quantity of target uplink packets, a proportion of target uplink packets, and an uplink packet payload fluctuation value; and the average transmission interval of uplink packets is an average transmission interval of the uplink packets in one time window, the average uplink payload size is an average payload size of target packets in at least one uplink data stream in the time window, the total uplink payload size is a total payload size of the target packets in the at least one uplink data stream in the time window, the quantity of uplink packets is a quantity of uplink packets in the at least one uplink data stream in the time window, the quantity of target uplink packets is a quantity of the target packets in the at least one uplink data stream in the time window, the proportion of target uplink packets is a proportion of the target packets in the at least one uplink data stream in the time window, and the uplink packet payload fluctuation value is used to indicate a fluctuation status of sizes of the target packets in the at least one uplink data stream in the time window.

The uplink stream feature includes at least one of an uplink terminal port fluctuation value, a total quantity of uplink data streams, a quantity of target uplink data streams, a quantity of uplink data streams of each of at least one data stream type, and a quantity of uplink data streams of each of at least one transmission protocol type; and the uplink terminal port fluctuation value is used to indicate a fluctuation status of output ports of the at least one uplink data stream in the first terminal in the time window, and the target uplink data stream is an uplink data stream whose corresponding server input port falls within a target port range.

In a possible implementation, the uplink packet feature further includes at least one of a first receive window fluctuation value and a first receive window size average; and the first receive window fluctuation value is used to indicate a fluctuation status of receive window sizes carried in the uplink packets in the time window.

In a possible implementation, the first receive window fluctuation value is a standard deviation of the receive window sizes carried in the uplink packets in the time window.

In a possible implementation, the first transmission feature further includes at least one of a total quantity of the at least one first data stream and a downlink transmission feature; and the downlink transmission feature is an overall transmission feature of at least one downlink data stream in the at least one first data stream.

In a possible implementation, the downlink transmission feature includes at least one of a downlink packet feature and a downlink stream feature; and the downlink packet feature is an overall feature of downlink packets in the at least one downlink data stream, and the downlink stream feature is a statistical feature of the at least one downlink data stream.

In a possible implementation, the downlink packet feature includes at least one of an average transmission interval of downlink packets, an average downlink payload size, a total downlink payload size, a quantity of downlink packets, a quantity of target downlink packets, a proportion of target downlink packets, and a downlink packet payload fluctuation value; and the average transmission interval of downlink packets is an average transmission interval of the downlink packets in one time window, the average downlink payload size is an average payload size of target packets in at least one downlink data stream in the time window, the total downlink payload size is a total payload size of the target packets in the at least one downlink data stream in the time window, the quantity of downlink packets is a quantity of downlink packets in the at least one downlink data stream in the time window, the quantity of target downlink packets is a quantity of the target packets in the at least one downlink data stream in the time window, the proportion of target downlink packets is a proportion of the target packets in the at least one downlink data stream in the time window, and the downlink packet payload fluctuation value is used to indicate a fluctuation status of sizes of the target packets in the at least one downlink data stream in the time window.

The downlink stream feature includes at least one of a downlink terminal port fluctuation value, a total quantity of downlink data streams, a quantity of target downlink data streams, a quantity of downlink data streams of each of at least one data stream type, and a quantity of downlink data streams of each of at least one transmission protocol type; and the downlink terminal port fluctuation value is used to indicate a fluctuation status of input ports of the at least one downlink data stream in the first terminal in the time window, and the target downlink data stream is a downlink data stream whose corresponding server output port falls within a target port range.

In a possible implementation, the downlink packet feature further includes at least one of a second receive window fluctuation value and a second receive window size average; and the second receive window fluctuation value is used to indicate a fluctuation status of receive window sizes carried in the downlink packets.

In a possible implementation, the second receive window fluctuation value is a standard deviation of the receive window sizes carried in the downlink packets in the time window.

In a possible implementation, the obtaining a first transmission feature of a first terminal includes: obtaining a stream transmission feature of each of the at least one first data stream; and obtaining the first transmission feature based on the stream transmission feature of the at least one first data stream.

In a possible implementation, a stream transmission feature of one first data stream includes at least one of transmission information of the first data stream, a data stream type, a target port type, and a packet feature; and the transmission information is used to indicate a transmission attribute of a data stream, the target port type is a port type of a port that transmits the first data stream in a server, and the packet feature is a feature of a packet in the first data stream.

In a possible implementation, the transmission information includes at least one element in a 5-tuple of the first data stream.

The packet feature includes at least one of a sum of packet transmission intervals, a payload size, a sum of payload squares, a quantity of target packets, a total quantity of packets, a receive window fluctuation value, a total window size, and a sum of window squares; and the sum of packet transmission intervals is a total duration of transmission intervals between the packets in the first data stream in one time window, the payload size is a total payload size of target packets in the first data stream in the time window, the sum of payload squares is a sum of squares of payload sizes of the target packets, the quantity of target packets is a total quantity of the target packets in the packets in the time window, the total quantity of packets is a total quantity of the packets in the time window, the receive window fluctuation value is used to indicate a fluctuation status of receive window sizes carried in the packets in the time window, the total window size is a sum of the receive window sizes carried in the packets in the time window, and the sum of window squares is a sum of squares of sizes of sliding windows.

In a possible implementation, the transmission information further includes at least one of a direction identifier and an identifier of the time window; and the direction identifier is used to indicate a transmission direction of the first data stream.

In a possible implementation, the reconstructing the first transmission feature based on the first transmission feature to obtain a second transmission feature includes: inputting the first transmission feature into a target model, reconstructing the first transmission feature based on the input first transmission feature by using the target model, and outputting the second transmission feature.

In a possible implementation, before the inputting the first transmission feature into a target model, the method further includes: performing training by using, as inputs and outputs of an initial model, a plurality of third transmission features of at least one second terminal of a target terminal type, to obtain the target model, where the target terminal type is a terminal type of the first terminal, and one third transmission feature is an overall transmission feature of at least one data stream transmitted by one second terminal.

In a possible implementation, before the inputting the first transmission feature into a target model, the method further includes: inputting a plurality of fourth transmission features of a plurality of target terminals of the target terminal type into the target model, reconstructing the fourth transmission features based on the plurality of input fourth transmission features by using the target model, and outputting a plurality of fifth transmission features; and obtaining the target difference based on the plurality of fifth transmission features and the plurality of fourth transmission features.

The target terminal type is the terminal type of the first terminal, the plurality of fourth transmission features are in one-to-one correspondence with the plurality of fifth transmission features, and one fourth transmission feature is an overall transmission feature of at least one data stream transmitted by one target terminal.

In a possible implementation, the obtaining the target difference based on the plurality of fifth transmission features and the plurality of fourth transmission features includes: obtaining the target difference based on a difference between at least one of the plurality of fifth transmission features and a corresponding fourth transmission feature.

In a possible implementation, before the inputting the first transmission feature into a target model, the method further includes: inputting a plurality of sixth transmission features of the plurality of target terminals of the target terminal type into the target model, reconstructing the sixth transmission features based on the plurality of input sixth transmission features by using the target model, and outputting a plurality of seventh transmission features; and determining, based on a difference between the plurality of seventh transmission features and corresponding sixth transmission features, that verification of the target model succeeds.

The target terminal type is the terminal type of the first terminal, the plurality of sixth transmission features are in one-to-one correspondence with the plurality of seventh transmission features, and one sixth transmission feature is an overall transmission feature of at least one data stream transmitted by one target terminal.

In a possible implementation, before the inputting the first transmission feature into a target model, the method further includes: obtaining transmission information of at least one second data stream transmitted by the at least one second terminal; storing the transmission information in association with the terminal type of the second terminal; and obtaining a plurality of transmission features of the at least one second terminal based on the transmission information associated with the terminal type.

The transmission information is used to indicate a transmission attribute of a data stream, and one transmission feature is an overall transmission feature of at least one data stream transmitted by a terminal.

In a possible implementation, before the inputting the first transmission feature into a target model, the method further includes: receiving the target model from a control device.

In a possible implementation, the method is executed by the control device or a network device.

According to a second aspect, a method for implementing terminal verification is provided. The method includes: obtaining a plurality of third transmission features of at least one second terminal of a target terminal type; and performing training by using the plurality of third transmission features as inputs and outputs of an initial model to obtain a target model.

One third transmission feature is an overall transmission feature of at least one data stream transmitted by one second terminal, the target model is used to reconstruct a transmission feature of a to-be-verified terminal of the target terminal type, to verify the to-be-verified terminal, and the transmission feature is an overall transmission feature of at least one data stream transmitted by the to-be-verified terminal.

In a possible implementation, after the performing training by using the plurality of third transmission features as inputs and outputs of an initial model, the method further includes: sending the target model to a network device.

In a possible implementation, before the performing training by using the plurality of third transmission features as inputs and outputs of an initial model, the method further includes: inputting a plurality of fourth transmission features of a plurality of target terminals of the target terminal type into the target model, reconstructing the fourth transmission features based on the plurality of input fourth transmission features by using the target model, and outputting a plurality of fifth transmission features; and obtaining a target difference based on the plurality of fifth transmission features and the plurality of fourth transmission features.

The plurality of fourth transmission features are in one-to-one correspondence with the plurality of fifth transmission features, and one fourth transmission feature is an overall transmission feature of at least one data stream transmitted by one target terminal.

In a possible implementation, the obtaining a target difference based on the plurality of fifth transmission features and the plurality of fourth transmission features includes: obtaining the target difference based on a difference between at least one of the plurality of fifth transmission features and a corresponding fourth transmission feature.

In a possible implementation, before the performing training by using the plurality of third transmission features as inputs and outputs of an initial model, the method further includes: inputting a plurality of sixth transmission features of the plurality of target terminals of the target terminal type into the target model, reconstructing the sixth transmission features based on the plurality of input sixth transmission features by using the target model, and outputting a plurality of seventh transmission features; and determining, based on a difference between the plurality of seventh transmission features and corresponding sixth transmission features, that verification of the target model succeeds.

The plurality of sixth transmission features are in one-to-one correspondence with the plurality of seventh transmission features, and one sixth transmission feature is an overall transmission feature of at least one data stream transmitted by one target terminal.

In a possible implementation, before the obtaining a plurality of third transmission features of at least one second terminal of a target terminal type, the method further includes: obtaining transmission information of at least one second data stream transmitted by the at least one second terminal; storing the transmission information in association with the terminal type of the second terminal; and obtaining a plurality of transmission features of the at least one second terminal based on the transmission information associated with the terminal type.

The transmission information is used to indicate a transmission attribute of a data stream, and one transmission feature is an overall transmission feature of at least one data stream transmitted by a terminal.

According to a third aspect, a system for implementing terminal verification is provided. The system includes a control device and a network device.

The control device is configured to: obtain a plurality of third transmission features of at least one second terminal of a target terminal type, where one third transmission feature is an overall transmission feature of at least one data stream transmitted by one second terminal; perform training by using the plurality of third transmission features as inputs and outputs of an initial model to obtain a target model; and send the target model to the network device.

The network device is configured to: obtain a first transmission feature of a first terminal of the target terminal type, where the first transmission feature is an overall transmission feature of at least one first data stream transmitted by the first terminal; input the first transmission feature into the target model, reconstruct the first transmission feature based on the input first transmission feature by using the target model, and output a second transmission feature, where the second transmission feature is the reconstructed first transmission feature; and determine, if a difference between the first transmission feature and the second transmission feature is greater than or equal to a target difference, that verification of the first terminal fails.

In a possible implementation, the control device is further configured to: input a plurality of fourth transmission features of a plurality of target terminals of the target terminal type into the target model, reconstruct the fourth transmission features based on the plurality of input fourth transmission features by using the target model, and output a plurality of fifth transmission features; and obtain the target difference based on the plurality of fifth transmission features and the plurality of fourth transmission features.

The plurality of fourth transmission features are in one-to-one correspondence with the plurality of fifth transmission features, and one fourth transmission feature is an overall transmission feature of at least one data stream transmitted by one target terminal.

In a possible implementation, the control device is further configured to: obtain the target difference based on a difference between at least one of the plurality of fifth transmission features and a corresponding fourth transmission feature.

In a possible implementation, the control device is further configured to: input a plurality of sixth transmission features of the plurality of target terminals of the target terminal type into the target model, reconstruct the sixth transmission features based on the plurality of input sixth transmission features by using the target model, and output a plurality of seventh transmission features; and determine, based on a difference between the plurality of seventh transmission features and corresponding sixth transmission features, that verification of the target model succeeds.

The plurality of sixth transmission features are in one-to-one correspondence with the plurality of seventh transmission features, and one sixth transmission feature is an overall transmission feature of at least one data stream transmitted by one target terminal.

In a possible implementation, the control device is further configured to: obtain transmission information of at least one second data stream transmitted by the at least one second terminal; store the transmission information in association with the terminal type of the second terminal; and obtain a plurality of transmission features of the at least one second terminal based on the transmission information associated with the terminal type.

The transmission information is used to indicate a transmission attribute of a data stream, and one transmission feature is an overall transmission feature of at least one data stream transmitted by a terminal.

In a possible implementation, the first transmission feature includes an uplink transmission feature, and the uplink transmission feature is an overall transmission feature of at least one uplink data stream in the at least one first data stream.

In a possible implementation, the uplink transmission feature includes at least one of an uplink packet feature and an uplink stream feature; and the uplink packet feature is an overall feature of uplink packets in the at least one uplink data stream, and the uplink stream feature is a statistical feature of the at least one uplink data stream.

In a possible implementation, the uplink packet feature includes at least one of an average transmission interval of uplink packets, an average uplink payload size, a total uplink payload size, a quantity of uplink packets, a quantity of target uplink packets, a proportion of target uplink packets, and an uplink packet payload fluctuation value; and the average transmission interval of uplink packets is an average transmission interval of the uplink packets in one time window, the average uplink payload size is an average payload size of target packets in at least one uplink data stream in the time window, the total uplink payload size is a total payload size of the target packets in the at least one uplink data stream in the time window, the quantity of uplink packets is a quantity of uplink packets in the at least one uplink data stream in the time window, the quantity of target uplink packets is a quantity of the target packets in the at least one uplink data stream in the time window, the proportion of target uplink packets is a proportion of the target packets in the at least one uplink data stream in the time window, and the uplink packet payload fluctuation value is used to indicate a fluctuation status of sizes of the target packets in the at least one uplink data stream in the time window.

The uplink stream feature includes at least one of an uplink terminal port fluctuation value, a total quantity of uplink data streams, a quantity of target uplink data streams, a quantity of uplink data streams of each of at least one data stream type, and a quantity of uplink data streams of each of at least one transmission protocol type; and the uplink terminal port fluctuation value is used to indicate a fluctuation status of output ports of the at least one uplink data stream in the first terminal in the time window, and the target uplink data stream is an uplink data stream whose corresponding server input port falls within a target port range.

In a possible implementation, the uplink packet feature further includes at least one of a first receive window fluctuation value and a first receive window size average; and the first receive window fluctuation value is used to indicate a fluctuation status of receive window sizes carried in the uplink packets in the time window.

In a possible implementation, the first transmission feature further includes at least one of a total quantity of the at least one first data stream and a downlink transmission feature; and the downlink transmission feature is an overall transmission feature of at least one downlink data stream in the at least one first data stream.

In a possible implementation, the downlink transmission feature includes at least one of a downlink packet feature and a downlink stream feature; and the downlink packet feature is an overall feature of downlink packets in the at least one downlink data stream, and the downlink stream feature is a statistical feature of the at least one downlink data stream.

In a possible implementation, the downlink packet feature includes at least one of an average transmission interval of downlink packets, an average downlink payload size, a total downlink payload size, a quantity of downlink packets, a quantity of target downlink packets, a proportion of target downlink packets, and a downlink packet payload fluctuation value; and the average transmission interval of downlink packets is an average transmission interval of the downlink packets in one time window, the average downlink payload size is an average payload size of target packets in at least one downlink data stream in the time window, the total downlink payload size is a total payload size of the target packets in the at least one downlink data stream in the time window, the quantity of downlink packets is a quantity of downlink packets in the at least one downlink data stream in the time window, the quantity of target downlink packets is a quantity of the target packets in the at least one downlink data stream in the time window, the proportion of target downlink packets is a proportion of the target packets in the at least one downlink data stream in the time window, and the downlink packet payload fluctuation value is used to indicate a fluctuation status of sizes of the target packets in the at least one downlink data stream in the time window.

The downlink stream feature includes at least one of a downlink terminal port fluctuation value, a total quantity of downlink data streams, a quantity of target downlink data streams, a quantity of downlink data streams of each of at least one data stream type, and a quantity of downlink data streams of each of at least one transmission protocol type; and the downlink terminal port fluctuation value is used to indicate a fluctuation status of input ports of the at least one downlink data stream in the first terminal in the time window, and the target downlink data stream is a downlink data stream whose corresponding server output port falls within a target port range.

In a possible implementation, the downlink packet feature further includes at least one of a second receive window fluctuation value and a second receive window size average; and the second receive window fluctuation value is used to indicate a fluctuation status of receive window sizes carried in the downlink packets.

In a possible implementation, the network device is further configured to: obtain a stream transmission feature of each of the at least one first data stream; and obtain the first transmission feature based on the stream transmission feature of the at least one first data stream.

In a possible implementation, a stream transmission feature of one first data stream includes at least one of transmission information of the first data stream, a data stream type, a target port type, and a packet feature; and the transmission information is used to indicate a transmission attribute of a data stream, the target port type is a port type of a port that transmits the first data stream in a server, and the packet feature is a feature of a packet in the first data stream.

In a possible implementation, the transmission information includes at least one element in a 5-tuple of the first data stream.

The packet feature includes at least one of a sum of packet transmission intervals, a payload size, a sum of payload squares, a quantity of target packets, a total quantity of packets, a receive window fluctuation value, a total window size, and a sum of window squares; and the sum of packet transmission intervals is a total duration of transmission intervals between the packets in the first data stream in one time window, the payload size is a total payload size of target packets in the first data stream in the time window, the sum of payload squares is a sum of squares of payload sizes of the target packets, the quantity of target packets is a total quantity of the target packets in the packets in the time window, the total quantity of packets is a total quantity of the packets in the time window, the receive window fluctuation value is used to indicate a fluctuation status of receive window sizes carried in the packets in the time window, the total window size is a sum of the receive window sizes carried in the packets in the time window, and the sum of window squares is a sum of squares of sizes of sliding windows.

In a possible implementation, the transmission information further includes at least one of a direction identifier and an identifier of the time window; and the direction identifier is used to indicate a transmission direction of the first data stream.

According to a fourth aspect, an apparatus for implementing terminal verification is provided, and is configured to perform the foregoing method for implementing terminal verification. Specifically, the apparatus for implementing terminal verification includes a functional module configured to perform the method for implementing terminal verification according to any one of the first aspect or the optional manners of the first aspect.

According to a fifth aspect, an apparatus for implementing terminal verification is provided, and is configured to perform the foregoing method for implementing terminal verification. Specifically, the apparatus for implementing terminal verification includes a functional module configured to perform the method for implementing terminal verification according to any one of the second aspect or the optional manners of the second aspect.

According to a sixth aspect, an electronic device is provided. The electronic device includes a processor and a memory. The memory stores at least one piece of program code. The program code is loaded and executed by the processor, to implement operations performed in the method for implementing terminal verification according to any one of the first aspect or the optional manners of the first aspect, or implement operations performed in the method for implementing terminal verification according to the second aspect or the optional manners of the second aspect.

According to a seventh aspect, a computer-readable storage medium is provided. The storage medium stores at least one piece of program code. The program code is loaded and executed by a processor, to implement operations performed in the method for implementing terminal verification according to the first aspect or the optional manners of the first aspect, or implement operations performed in the method for implementing terminal verification according to the second aspect or the optional manners of the second aspect.

According to an eighth aspect, a computer program product or a computer program is provided. The computer program product or the computer program includes program code. The program code is stored in a computer-readable storage medium. A processor of an electronic device reads the program code from the computer-readable storage medium. The processor executes the program code, to enable the electronic device to perform the method for implementing terminal verification according to the first aspect or the optional manners of the first aspect, or perform the method for implementing terminal verification according to the second aspect or the optional manners of the second aspect.

DETAILED DESCRIPTION OF ILLUSTRATIVE EMBODIMENTS

To make objectives, technical solutions, and advantages of this application clearer, the following further describes implementations of this application in detail with reference to the accompanying drawings.

Figure 1:
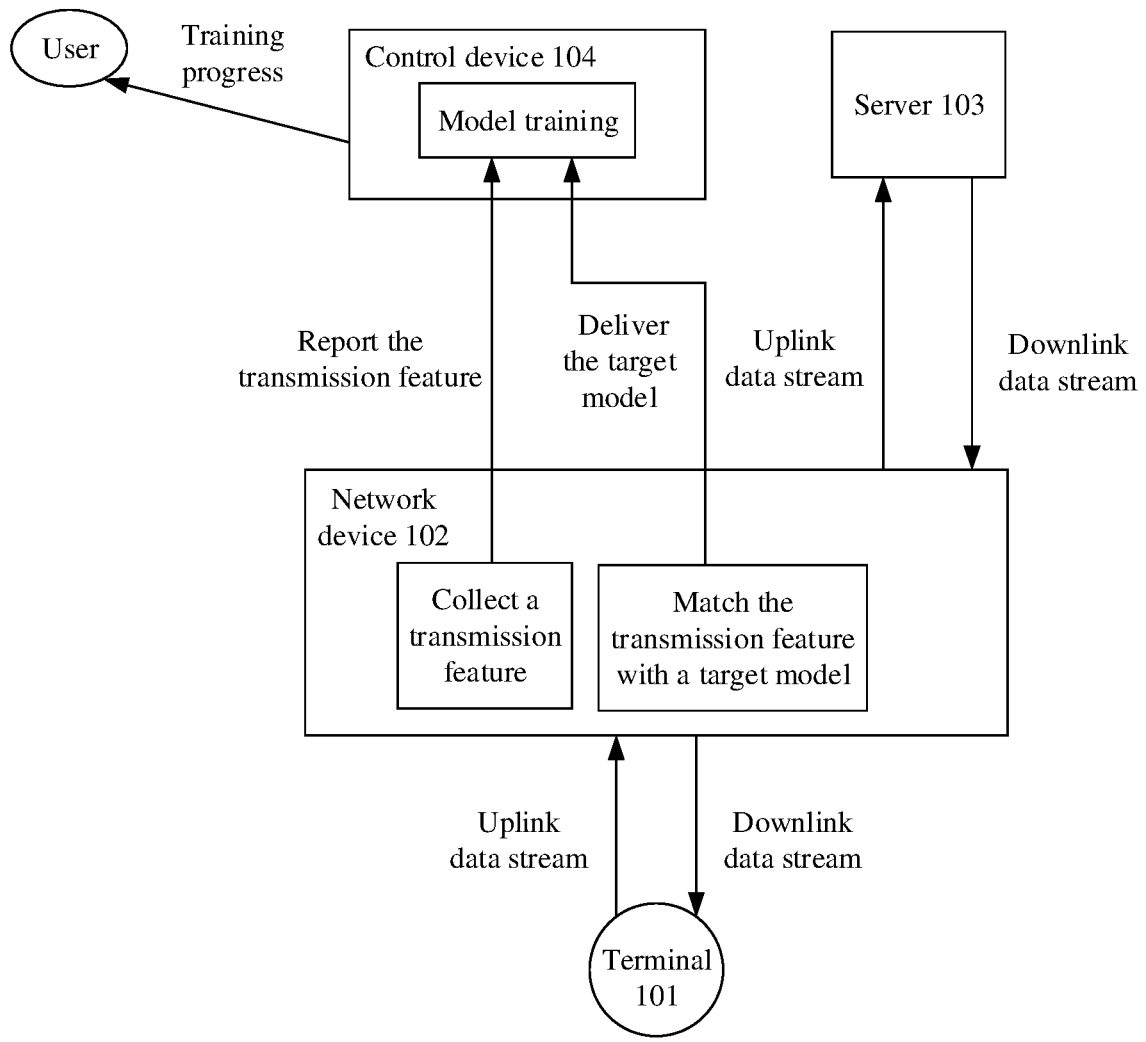
FIG. 1 is a schematic diagram of a system for implementing terminal verification according to an embodiment of this application.

FIG. 1 is a schematic diagram of a system for implementing terminal verification according to an embodiment of this application. Refer to FIG. 1. The system 100 includes a plurality of terminals 101, a plurality of network devices 102, a plurality of servers 103, and a control device 104.

One terminal 101 is configured to send a data stream to the server 103 through the network device 102. In a possible implementation, the terminal 101 outputs the data stream to the network device 102, and the network device 102 forwards, to the server 103, the data stream output by the terminal 101. In this case, the terminal 101 is also a data stream output device, and the server 103 is a data stream input device. The terminal 101 is further configured to receive a data stream from the server 103 through the network device 102. In a possible implementation, the server 103 outputs the data stream to the network device 102, and the network device 102 forwards, to the terminal 101, the data stream output by the server 103. In this case, the terminal 101 is a data stream input device, and the server 103 is a data stream output device.

For ease of description, the data stream output device is denoted as a "first device", and the data stream input device is denoted as a "second device". To distinguish between transmission directions of the data streams, the data stream output by the terminal 101 is recorded as an "uplink data stream". In this case, the terminal 101 is the first device, and the server 103 is the second device. The data stream input by the terminal 101 is recorded as a "downlink data stream". In this case, the terminal 101 is the second device, and the server 103 is the first device. Both the uplink data stream and the downlink data stream of the terminal 101 are data streams transmitted by the terminal 101. In a possible implementation, the terminal 101 is an IoT terminal, for example, a camera, a sounder, a printer, an IP phone, an automatic teller machine (ATM), or an inquiry machine.

In addition to forwarding the data stream, the network device 102 is further configured to collect a transmission feature of the terminal 101 and report the collected transmission feature of the terminal 101 to the control device 104, and the control device 104 verifies the terminal 101 based on the transmission feature of the terminal 101 to determine whether the terminal 101 is a normal terminal or an abnormal terminal.

The normal terminal is a terminal with normal behavior. If the terminal performs legal interaction with the server according to a preset rule, it is considered that the behavior is normal. For example, if the terminal performs a preset service by accessing the server within a time period specified in the preset rule, or if the terminal performs legal interaction with the server within a permission range specified in the preset rule, the behavior of the terminal is normal, and the terminal is a normal terminal. The abnormal terminal is a terminal with abnormal behavior. If the terminal does not interact with the server according to a preset rule, or interaction between the terminal and the server is illegal, it is considered that the behavior is abnormal. For example, if the terminal performs illegal interaction with the server by spoofing a terminal having permission specified in the preset rule, or if the terminal performs illegal interaction with the server outside permission specified in the preset rule, the behavior of the terminal is abnormal, and the terminal is an abnormal terminal. The illegal interaction between the terminal and the server includes various cases, such as illegal access by the terminal to specific content in the server, access by the terminal to the server in a time outside the time period specified in the preset rule, the terminal maliciously attacking a network after being attacked as a springboard by a hacker, or the terminal performing an illegal service.

The transmission feature collected by the network device 102 is an actual transmission feature of the terminal 101, and can reflect behavior of the terminal 101. Optionally, the control device 104 has a capability of reconstructing the actual transmission feature of the terminal 101. The control device 104 reconstructs the actual transmission feature of the terminal 101 to obtain a transmission feature after the reconstruction, where the transmission feature after the reconstruction is also a reconstructed actual transmission feature. If a difference between the actual transmission feature and the transmission feature after the reconstruction is less than a target difference, it indicates that the difference between the actual transmission feature and the transmission feature after the reconstruction is relatively small. The control device 104 determines that terminal behavior represented by the actual transmission feature is normal and the actual transmission feature is a normal transmission feature, and determines that the terminal 101 is a normal terminal. In this case, verification of the terminal 101 performed by the control device 104 succeeds. If a difference between the actual transmission feature and the transmission feature after the reconstruction is greater than or equal to a target difference, it indicates that the difference between the actual transmission feature and the transmission feature after the reconstruction is relatively large. The control device 104 determines that terminal behavior represented by the actual transmission feature is abnormal and the actual transmission feature is an abnormal transmission feature, and determines that the terminal 101 is an abnormal terminal. In this case, verification of the terminal 101 performed by the control device 104 fails.

In a possible implementation, the control device 104 reconstructs the actual transmission feature based on a target model. The control device 104 obtains the target model through training before reconstructing the actual transmission feature based on the target model. Optionally, the network device 102 collects a plurality of transmission features of at least one normal terminal 101 of a same terminal type and sends the plurality of transmission features to the control device 104, and the control device 104 performs training by using the plurality of transmission features as inputs and outputs of an initial model to obtain the target model, so that the control device 104 subsequently reconstructs the actual transmission feature of the terminal 101 of the terminal type based on the target model. Optionally, the control device 104 can further display a training progress in a training process, so that the user can learn of the training progress.

It should be noted that, the network device 102 described above is responsible for collecting a transmission feature, and the control device 104 performs training based on the transmission feature collected by the network device 102 to obtain the target model, and verifies the terminal 101 based on the target model. However, in a possible implementation, the network device 102 is responsible for collecting the transmission feature. The control device 104 performs training based on the transmission feature collected by the network device 102 to obtain at least one target model, where each target model corresponds to one terminal type, and sends the at least one target model to the network device 102. After collecting a transmission feature of any terminal 101, the network device 102 determines, based on a terminal type of the any terminal 101, a target model corresponding to the terminal type of the any terminal 101 in the at least one target model. The network device 102 reconstructs the transmission feature of the any terminal 101 based on the determined target model, to verify the any terminal 101.

However, in a possible implementation, the network device 102 forwards, to the control device 104, the data stream forwarded by the network device 102, and the control device 104 collects, based on the data stream forwarded by the network device 102, the transmission feature of the terminal 101, performs training, and verifies the terminal 101 based on the target model obtained through training.

Optionally, the network device 102 includes one of a firewall device, a router, and a switch.

The network device 102 and the control device 104 described above are two separate electronic devices. However, in another possible implementation, the network device 102 and the control device 104 are a same electronic device, and the electronic device has both functions of the network device 102 and the control device 104.

Figure 2:
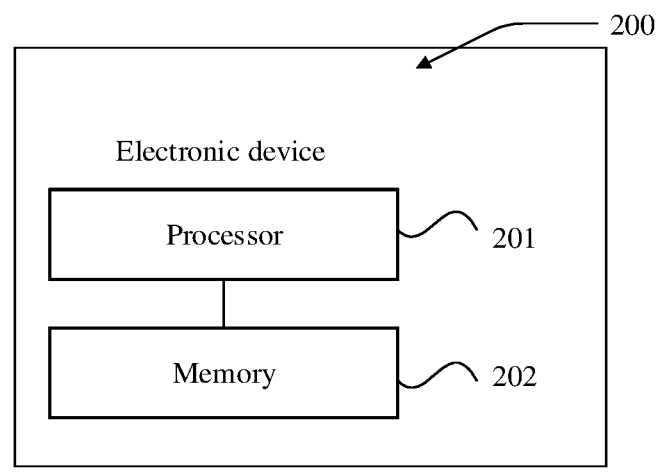
FIG. 2 is a schematic diagram of a structure of an electronic device according to an embodiment of this application.

FIG. 2 is a schematic diagram of a structure of an electronic device according to an embodiment of this application. The electronic device 200 is provided as the foregoing network device and/or control device, and the electronic device 200 may relatively greatly vary due to different configurations or performance, and include one or more processors 201 and one or more memories 202. The processor 201 is a central processing unit (CPU) or another type of processor, and the memory 202 stores at least one piece of program code. The at least one piece of program code is loaded and executed by the processor 201, to implement steps performed by the network device and/or the control device provided in the following method embodiments. Certainly, optionally, the electronic device 200 further includes components such as a wired or wireless network interface, a keyboard, and an input/output interface, to perform inputting/outputting. The electronic device 200 further includes another component configured to implement a device function, and details are not described herein again.

In an example embodiment, a computer-readable storage medium, such as a memory including program code, is further provided. The program code may be executed by a processor in a terminal to complete the method for implementing terminal verification in the following embodiments. For example, the computer-readable storage medium is a non-temporary computer-readable storage medium such as a read-only memory (ROM), a random access memory (RAM), a compact disc read-only memory (CD-ROM), a tape, a floppy disk, and an optical data storage device.

Figure 3:
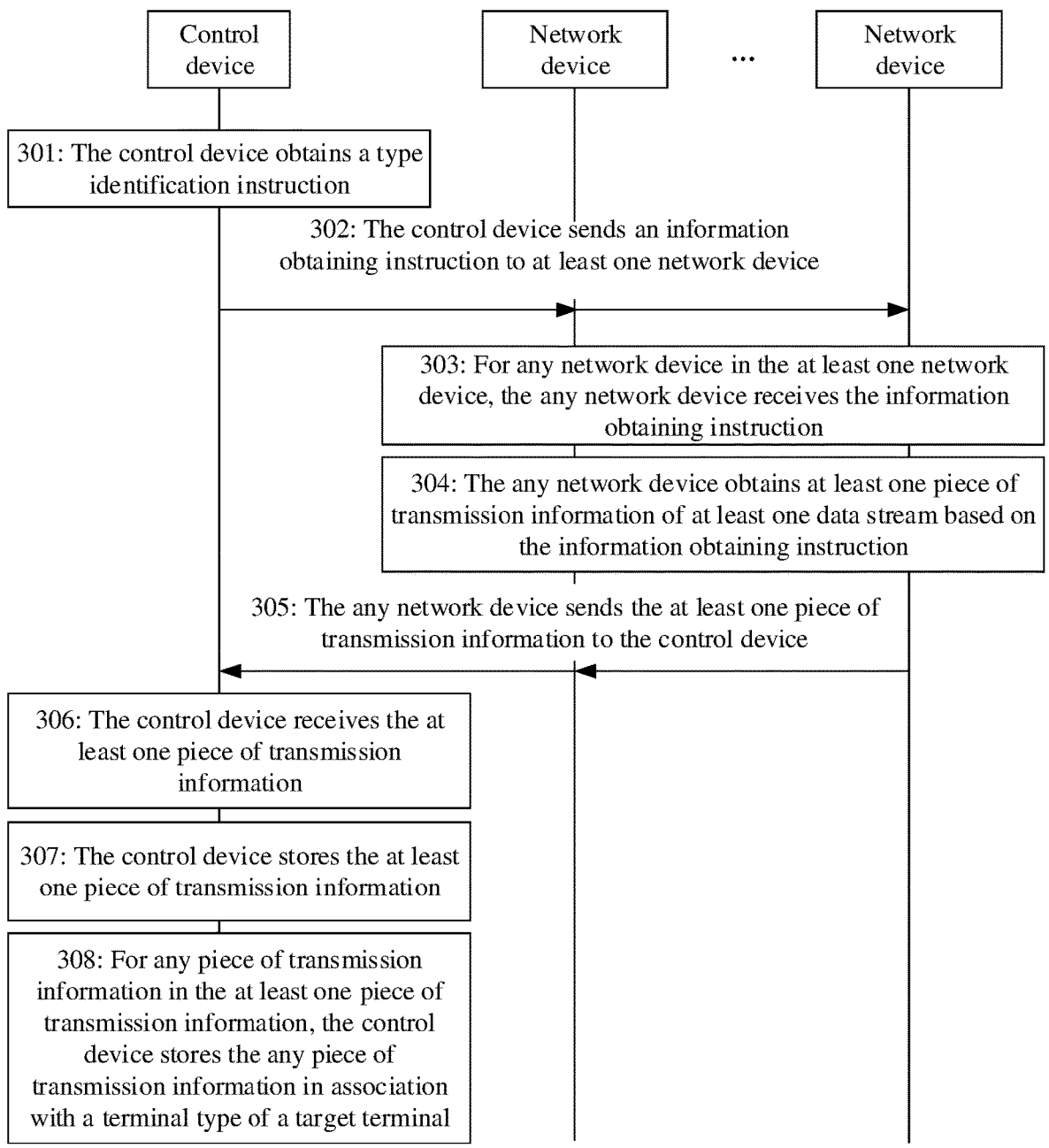
FIG. 3 is a flowchart of terminal type identification according to an embodiment of this application.

In an initialization process of a terminal verification system, the control device can perform type identification on a terminal in the terminal verification system to determine a terminal type of the terminal in the terminal verification system. To further explain the process in which the control device performs type identification on the terminal in the terminal verification system, reference is made to a flowchart of terminal type identification according to an embodiment of this application shown in FIG. 3.

301: A control device obtains a type identification instruction, where the type identification instruction is used to indicate to identify a terminal type of a terminal.

The type identification instruction includes an identification identifier. The identification identifier is used to indicate the terminal type of the terminal. In a possible implementation, the type identification instruction is triggered by an operation of a user. When the control device detects that the user performs, on the control device, the operation for triggering the type identification instruction, the control device is triggered to obtain the type identification instruction.

When networking of a terminal verification system is complex, control devices in the terminal verification system can be further classified into a plurality of levels of control devices, which are respectively a central control device and a plurality of regional control devices. The central control device is configured to manage the plurality of regional control devices, and each of the regional control devices is configured to manage a network device in at least one network area. After obtaining the type identification instruction based on the operation of the user, the central control device can further send the obtained type identification instruction to each of the regional control devices, so that each of the regional control devices can receive the type identification instruction from the central control device. In this case, the control device in step 301 is a regional control device.

In a possible implementation, each time the control device obtains the type identification instruction, the control device performs a terminal type identification process (that is, step 302 to step 308). In another possible implementation, the control device receives the type identification instruction only once, and periodically performs the terminal type identification process after receiving the type identification instruction. An opportunity for the terminal type identification is not specifically limited in this embodiment of this application.

302: The control device sends an information obtaining instruction to at least one network device, where the information obtaining instruction is used to instruct the network device to upload transmission information of a data stream.

The at least one network device is a network device managed by the control device. The transmission information of a data stream is used to indicate a transmission attribute of the data stream. For example, a transmission address, a transmission port, a transmission protocol, a transmission direction, and a transmission time are respectively transmission attributes of the data stream. The information obtaining instruction includes an attribute identifier of at least one transmission attribute, to instruct the network device to upload the at least one transmission attribute of the data stream based on the attribute identifier of the at least one transmission attribute.

303: For any network device in the at least one network device, the any network device receives the information obtaining instruction.

304: The any network device obtains at least one piece of transmission information of at least one data stream based on the information obtaining instruction.

The at least one data stream is a data stream transmitted by the network device in one time window, a duration of the time window is a target duration, and the time window is a detection time of detecting the at least one data stream by the any network device. Optionally, the at least one data stream includes at least one uplink data stream. Optionally, the at least one data stream further includes at least one downlink data stream. Transmission information of one data stream includes at least one element in a 5-tuple of the first data stream, and the 5-tuple of the first data stream includes source address information, a source port identifier, destination address information, a destination port identifier, and a transmission protocol type of the data stream.

The source address information is used to indicate a network address of a first device that outputs the data stream, the first device is a device, for example, a server or a terminal, that outputs the data stream to the network device, and the source address information includes an IP address of the first device. The source port identifier is used to indicate an output port that is in the first device and that is configured to output the data stream.

The destination address information is used to indicate an IP address of a second device that inputs the data stream. The second device is a device that inputs the data stream, that is, a device, such as a server or a terminal, configured to receive the data stream forwarded by the network device. The destination address information includes a network address of the second device. The destination port identifier is used to indicate an input port that is in the second device and that is used to input the data stream.

It should be noted that, one of the first device and the second device is a terminal, and the other is a server. If the first device is a terminal, the data stream is also an uplink data stream. If the second device is a terminal, the data stream is also a downlink data stream. Optionally, a network address of one device includes at least one of an IP address of the device and a media access control (MAC) address, and a network address of the first device is also a source network address, for example, a source IP address or a source MAC address. The network address of the second device is also a destination network address, for example, a destination IP address or a destination MAC address. It should be noted that an example in which the network address of the device is an IP address is used for description in this embodiment of this application.

The transmission protocol type is used to indicate a transmission protocol followed by the data stream, for example, a transmission control protocol (TCP), a user datagram protocol (UDP), or an internet control message protocol (ICMP).

In a possible implementation, the transmission information further includes at least one of a direction identifier and an identifier of the time window. The direction identifier includes an uplink identifier or a downlink identifier. If the direction identifier is an uplink identifier, it is indicated that the data stream is an uplink data stream. If the direction identifier is a downlink identifier, it is indicated that the data stream is a downlink data stream.

The any network device includes a plurality of ports, which are respectively at least one first input port, at least one first output port, at least one second input port, and at least one second output port. The first input port is configured to input a data stream output from the terminal, that is, configured to input the uplink data stream, and the first output port is configured to output the uplink data stream to the server. The second input port is configured to input a data stream output from the server, that is, configured to input the downlink data stream, and the second output port is configured to output the downlink data stream to the terminal.

The any network device obtains transmission information of the at least one data stream based on the data stream transmitted by the input port or the output port in the any network device. In a possible implementation, a process in which the any network device obtains the transmission information of the at least one data stream based on the input port in the any network device and the information obtaining instruction is implemented by using step 3041 to step 3043.

Step 3041: For any input port of the at least one first input port or the at least one second input port, the any network device obtains, in one time window, metadata of a plurality of packets input by the any one input port.

A time window with a target duration is provided in the any network device, and the any network device detects, in the time window, a data stream transmitted by the any network device, to obtain a stream transmission feature of the data stream transmitted by the any network device in the time window. The transmission information of the data stream belongs to the stream transmission feature of the data stream. The time window is a time period in which a target duration is located after the any network device receives the information obtaining instruction. For example, if the any network device performs step 3041 within the target duration after the any network device receives the information obtaining instruction, the target duration after the any network device receives the information obtaining instruction is also the time window.

The plurality of packets are packets in data streams input in the any input port in the time window. Metadata of one packet includes stream identifier information, a source MAC address, and a destination MAC address of a data stream to which the packet belongs. Optionally, the stream identifier information of the data stream is a 5-tuple, including a source IP address, a source port identifier, a destination IP address, a destination port identifier, and a transmission protocol type of the data stream.

For the any input port, the any network device separately obtains, at a plurality of time points in the time window, a plurality of packets from the data streams input through the any input port, and parses the plurality of packets to obtain metadata of the plurality of packets.

Step 3042: The any network device deduplicates the metadata of the plurality of packets to obtain metadata of at least one packet, where the metadata of the at least one packet is different from each other, and each of the at least one packet belongs to different data streams.

One or more data streams may be input through the any input port in the time window. In this case, some packets in the plurality of packets may belong to a same data stream. To avoid uploading of duplicate information, the any network device deduplicates the metadata of the plurality of packets to obtain the metadata of the at least one packet. For example, the plurality of packets are respectively a packet 1 to a packet 3, where metadata of the packet 1 is the same as metadata of the packet 2 and is different from metadata of the packet 3. In this case, both the packet 1 and the packet 2 belong to the data stream 1, but the packet 3 belongs to the data stream 2. In this case, the any network device retains the metadata of the packet 1 and the metadata of the packet 3 by deduplicating the metadata of the packet 1 to the packet 3.

Step 3043: For any packet in the at least one packet, the any network device generates, based on the information obtaining instruction, transmission information of a data stream to which the any packet belongs.

The any network device generates, based on at least one attribute identifier included in the information obtaining instruction, the transmission information of the data stream to which the any packet belongs. In a possible implementation, if the information obtaining instruction includes an attribute identifier of a transmission address, the any network device determines at least one of a source IP address and a source MAC address in metadata of the any packet as source address information of the data stream, and the any network device determines at least one of a destination IP address and a destination MAC address in the metadata of the any packet as destination address information of the data stream, and adds the source address information and the destination address information to the transmission information of the data stream. If the information obtaining instruction includes an attribute identifier of a transmission port, the any network device adds a source port identifier and a destination port identifier in the metadata of the any packet to the transmission information of the data stream. If the information obtaining instruction includes an attribute identifier of a transmission protocol, the any network device adds a transmission protocol type to the metadata of the any packet to the transmission information of the data stream. If the information obtaining instruction includes an attribute identifier of a transmission direction, the any network device determines, based on a port that is in the any network device and that is used to transmit the any packet or based on source address information of the data stream, the transmission direction of the data stream, and adds a direction identifier used to indicate the transmission direction to the transmission information of the data stream. If the information obtaining instruction carries an attribute identifier of a transmission time, the any network device adds the identifier of the time window to the transmission information of the data stream.

In a possible implementation, a process in which the any network device determines, based on a port that is in the any network device and that is used to transmit the any packet or based on source address information of the data stream, the transmission direction of the data stream is as follows: If a port that is in the any network device and that is used to input the any packet is the first input port, or a port that is in the any network device and that is used to output the any packet is the first output port, the data stream is an uplink data stream, and the any network device determines that the transmission direction of the data stream is an uplink. If a port that is in the any network device and that is used to input the any packet is the second input port, or a port that is in the any network device and that is used to output the any packet is the second output port, the data stream is a downlink data stream, and the any network device determines that the transmission direction of the data stream is a downlink. If a first device indicated by the source address information of the data stream is a terminal, the data stream is an uplink data stream, and the any network device determines that the transmission direction of the data stream is an uplink. If a second device indicated by the source address information of the data stream is a server, the data stream is a downlink data stream, and the any network device determines that the transmission direction of the data stream is a downlink.

For example, in the time window, the any network device transmits three data streams in total, which are respectively a data stream 1 to a data stream 3, where both the data stream 1 and the data stream 2 are uplink data streams, and the data stream 3 is a downlink data stream. Through step 3043, the any network device can obtain transmission information of the data stream 1 to the data stream 3 shown in Table 1.

TABLE 1

| Data stream | Source IP address | Source port identifier | Source MAC address | Destination IP address | Destination port identifier | Destination MAC address | Direction identifier | Transmission type |
|---|---|---|---|---|---|---|---|---|
| Data stream 1 | 192.168.1.240 | 43360 | AAA | 10.137.56.31 | 30 | DDD | Uplink identifier | TCP |
| Data stream 2 | 192.168.1.180 | 43361 | BBB | 10.137.56.32 | 40 | EEE | Uplink identifier | UDP |
| Data stream 3 | 10.137.56.30 | 20 | CCC | 192.168.1.150 | 43362 | FFF | Downlink identifier | ICMP |

If the at least one data stream transmitted by the any network device includes at least one second data stream transmitted by a second terminal, the process shown in step 304 is also a process in which the any network device obtains transmission information of the at least one second data stream transmitted by the second terminal.

305: The any network device sends the at least one piece of transmission information to the control device.

306: The control device receives the at least one piece of transmission information.

If the at least one data stream includes the at least one second data stream transmitted by the second terminal, the process shown in step 306 is also a process in which the control device obtains the transmission information of the at least one second data stream transmitted by the second terminal.

307: The control device stores the at least one piece of transmission information.

The control device extracts at least one piece of information from each piece of transmission information and stores the at least one piece of information into a configuration table to implement asset identification. In a possible implementation, the control device stores each item of information in each piece of transmission information into the configuration table. In this case, the configuration table is shown as Table 1.

In a possible implementation, the control device stores some information in each piece of transmission information into the configuration table, where the some information includes a direction identifier and a network address of a terminal. Optionally, the control device stores a network address, of a terminal in at least one piece of transmission information that includes a same direction identifier, in association with the direction identifier. If the network address of the terminal is an IP address, the control device stores the direction identifier in association with the IP address of the terminal. If a direction identifier in one piece of transmission information is an uplink identifier, it indicates that a data stream corresponding to the transmission information is an uplink data stream and a source IP address in the transmission information is the IP address of the terminal. In this case, the control device adds the source IP address to the configuration table, and enables the source IP address to correspond to the uplink identifier. If a direction identifier in one piece of the transmission information is a downlink identifier, it indicates that a data stream corresponding to the transmission information is a downlink data stream, and a destination IP address in the transmission information is the IP address of the terminal. In this case, the control device adds the destination IP address to the configuration table, and enables the destination IP address to correspond to the downlink identifier.

If the at least one piece of transmission information is shown in Table 1, the control device extracts, from Table 1, a source IP address corresponding to an uplink identifier and a destination IP address corresponding to a downlink identifier, stores the extracted source IP address in association with the uplink identifier into a configuration table shown as Table 2, and stores the extracted destination IP address in association with the downlink identifier into the configuration table shown as Table 2.

TABLE 2

| Uplink identifier<br>Source IP address | Downlink identifier<br>Destination IP address |
| --- | --- |
| 192.168.1.240<br>192.168.1.180 | 192.168.1.150 |

308: For any piece of transmission information in the at least one piece of transmission information, the control device stores the any piece of transmission information in association with a terminal type of a first target terminal, where the first target terminal is configured to transmit a data stream corresponding to the any piece of transmission information.

The terminal type includes a camera, a sounder, a printer, an IP phone, an ATM, or an inquiry machine. The control device stores at least one piece of information, in the any piece of transmission information, in association with the terminal type of the target terminal. Optionally, the control device stores the at least one piece of information in association with the terminal type of the first target terminal into the asset table, where the asset table is used to store a plurality of terminal types, and the asset table is stored in a local or cloud space of the control device.

The control device obtains the at least one piece of information in the any piece of transmission information from the configuration table, and queries the asset table based on the at least one piece of information to determine whether a terminal type corresponding to the at least one piece of information exists. If the terminal type corresponding to the at least one piece of information exists, it indicates that the terminal type corresponding to the at least one piece of information is the terminal type of the first target terminal. In this case, because the control device has stored the at least one piece of information in association with the terminal type of the first target terminal, the control device does not need to perform step 308 again. If the terminal type corresponding to the at least one piece of information does not exist, the control device stores the at least one piece of information in association with the terminal type of the first target terminal into the asset table.

In a possible implementation, if the terminal type corresponding to the at least one piece of information does not exist in the asset table, the control device displays terminal type addition information in a terminal type addition interface, to provide a prompt indicating the user to add the terminal type corresponding to the at least one piece of information to the asset table. The terminal type addition information is used to indicate to add the terminal type corresponding to the at least one piece of information to the asset table, the terminal type addition information includes the at least one piece of information and an addition identifier, and the addition identifier is used to indicate to add the terminal type corresponding to the at least one piece of information to the asset table.

The user determines the terminal type of the first target terminal based on the at least one piece of information in the terminal type addition information, and adds the terminal type of the first target terminal on the terminal type addition interface. After the control device detects that the user performs the addition operation on the terminal type addition interface, the control device is triggered to store the at least one piece of information in association with the terminal type added by the user into the asset table.

If the at least one piece of information includes a network address of a terminal, and if the network address of the terminal is an IP address, for any IP address in the configuration table, the network device stores a terminal type, of the terminal indicated by the any IP address, in association with the any IP address, into the asset table. The configuration table shown as Table 2 is still used as an example. If a terminal indicated by the IP address 192.168.1.240 is a camera, a terminal indicated by the IP address 192.168.1.180 is a camera, and a terminal indicated by the IP address 192.168.1.150 is a sounder, the control device stores the three IP addresses in association with corresponding terminal types into the asset table, to obtain Table 3.

TABLE 3

| Terminal type | IP address of a terminal |
|---|---|
| Camera | 192.168.1.240 |
|  | 192.168.1.180 |
| Sounder | 192.168.1.150 |

If the at least one data stream is the at least one second data stream transmitted by the second terminal, the process shown in step 308 is also a process in which the control device stores the at least one piece of transmission information, of the at least one second data stream, in association with the terminal type of the second terminal.

Figure 4:
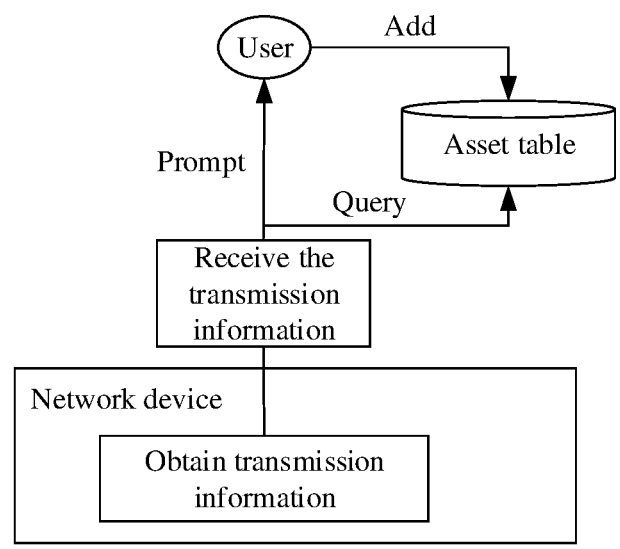
FIG. 4 is a schematic diagram of a storage terminal type according to an embodiment of this application.

To further describe the process shown in step 301 to step 308, reference is made to a schematic diagram of a storage terminal type according to an embodiment of this application shown in FIG. 4. For a data stream transmitted by the network device, the network device obtains transmission information of the transmitted data stream, and sends the obtained transmission information to the control device. The control device stores the received transmission information, and queries the asset table to determine whether a terminal type corresponding to the transmission information exists. If the terminal type corresponding to the transmission information does not exist, the control device provides a prompt indicating the user to add the terminal type corresponding to the transmission information to the asset table, and the control device then adds the terminal type corresponding to the transmission information to the asset table based on an operation of the user.

In the method shown in this embodiment of this application, the network device uploads the transmission information of the data stream to the control device, so that the control device stores transmission information, of each data stream transmitted by the terminal in the terminal verification system, in association with the terminal type. In this way, statistics is collected on terminal types of terminals in the terminal verification system.

It should be noted that, in the process shown in step 301 to step 308, the network device uploads, based on the information obtaining instruction, the transmission information of the data stream to the control device, and the control device stores the transmission information uploaded by the network device. In another possible implementation, the control device does not send the information obtaining instruction to the network device, but sends a data stream obtaining instruction to the network device. After the network device receives the data stream obtaining instruction, the network device copies a plurality of packets in the at least one data stream transmitted in the time window, and uploads the packets to the control device, and the control device obtains transmission information of the at least one data stream based on the plurality of packets that are in the at least one data stream and that are uploaded by the network device, and performs step 307 and step 308. The process in which the control device obtains the at least one piece of transmission information of the at least one data stream based on the plurality of packets that are in the at least one data stream and that are uploaded by the network device is similar to the process shown in step 3041 to step 3043. Herein, details about the process in which the control device obtains the at least one piece of transmission information of the at least one data stream based on the plurality of packets that are in the at least one data stream and that are uploaded by the network device are not described in this embodiment of this application. In a possible implementation, if the control device does not exist in the terminal verification system, the network device periodically performs step 304, step 307, and step 308.

Figure 5A:
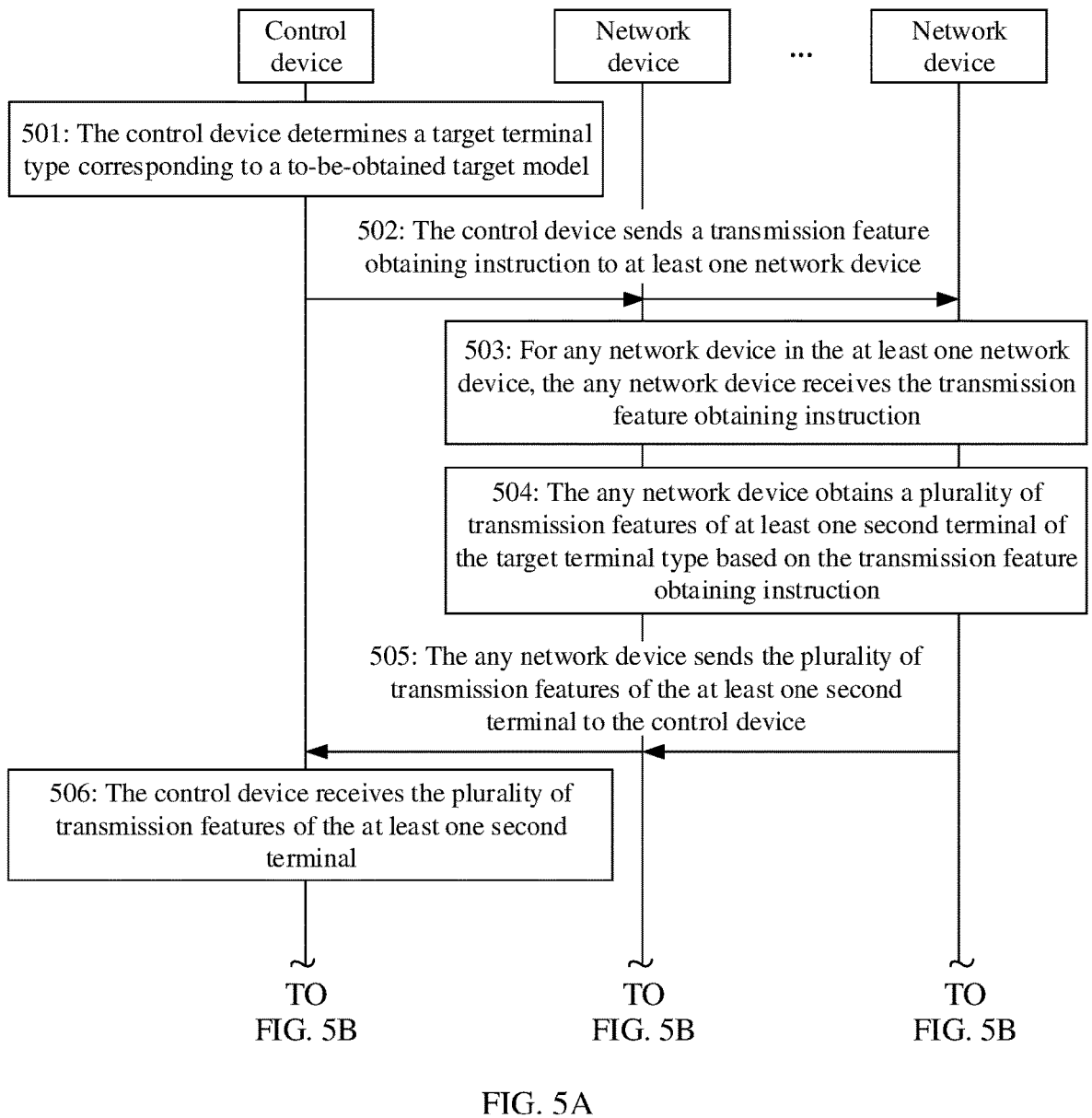
FIG. 5A and FIG. 5B are a flowchart of a model obtaining method according to an embodiment of this application.
Figure 5B:
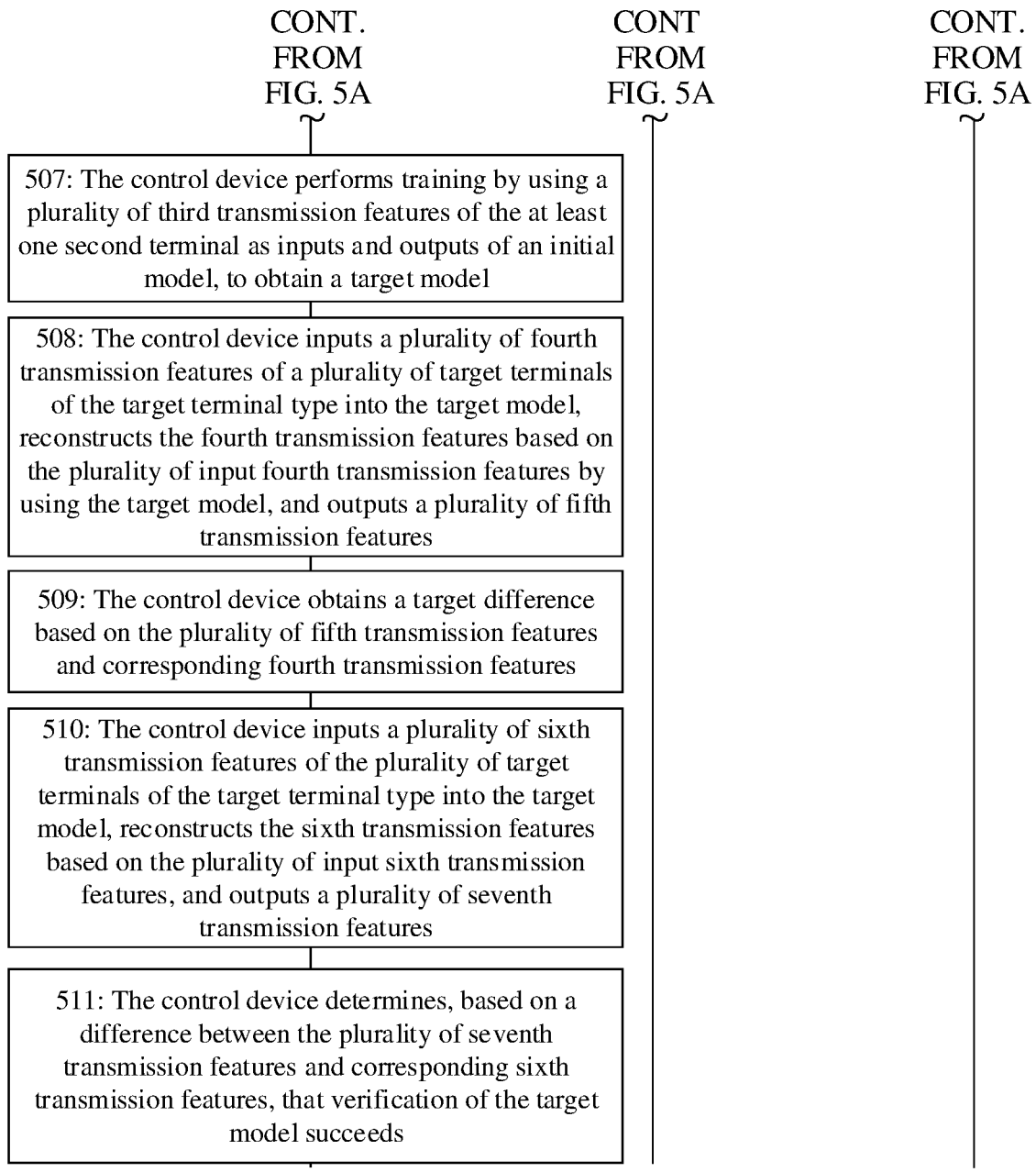

For any terminal type recorded in the asset table, the control device obtains, from at least one network device, a plurality of transmission features of terminals of the any terminal type, and performs training based on the plurality of obtained transmission features, to obtain a target model corresponding to the any terminal type. To further describe the process, reference is made to a flowchart of a model obtaining method according to an embodiment of this application shown in FIG. 5A and FIG. 5B.

501: A control device determines a target terminal type corresponding to a to-be-obtained target model.

In a possible implementation, the control device determines the target terminal type based on an operation of a user. The user inputs the target terminal type in a training interface of the control device, and performs an acknowledgment operation, to enable a training process. After the control device detects, in the training interface, that the user performs the acknowledgment operation, the control device obtains the target terminal type from the training interface.

502: The control device sends a transmission feature obtaining instruction to at least one network device, where the transmission feature obtaining instruction is used to instruct to obtain a transmission feature of a terminal of the target terminal type.

The transmission feature obtaining instruction includes the target terminal type and at least one network address corresponding to the target terminal type, each network address corresponds to one terminal, and a transmission feature of one terminal is an overall transmission feature of at least one data stream transmitted by the terminal.

In a possible implementation, the control device queries an asset table for at least one network address corresponding to the target terminal type, forms a terminal address list by using the at least one network address obtained by query, and adds the terminal address list to the transmission feature obtaining instruction. The terminal address list is used to record the target terminal type and the at least one network address corresponding to the target terminal type. For example, the at least one network address corresponding to the target terminal type is an IP address of the terminal. Refer to the terminal address list shown in Table 4.

TABLE 4

| Target terminal type | IP address |
|---|---|
| Camera | 192.168.1.2 |
|  | 192.168.1.5 |
|  | 192.168.1.6 |

Figure 6:
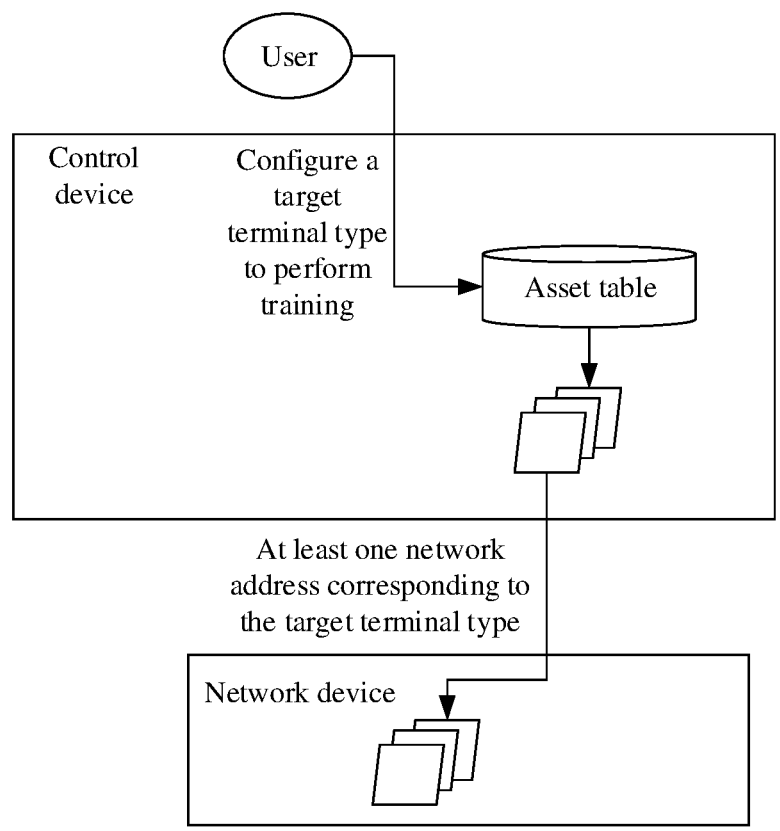
FIG. 6 is a schematic diagram of enabling training according to an embodiment of this application.

To further describe the process shown in step 501 and step 502, reference is made to a schematic diagram of enabling training according to this embodiment of this application shown in FIG. 6. The user configures the target terminal type as a terminal type corresponding to the to-be-obtained target model (that is, the user configures the target terminal type for training). The control device queries the asset table based on the target terminal type configured by the user, to obtain at least one network address corresponding to the target terminal type, and delivers the target terminal type and the at least one network address to the network device, to enable the training process.

503: For any network device in the at least one network device, the any network device receives the transmission feature obtaining instruction.

504: The any network device obtains a plurality of transmission features of at least one second terminal of the target terminal type based on the transmission feature obtaining instruction.

The at least one second terminal is a terminal indicated by the at least one network address in the transmission feature obtaining instruction. A terminal type of the at least one second terminal is the target terminal type. One transmission feature of one terminal is an overall transmission feature of at least one data stream transmitted by the terminal. The transmission feature may include features of a plurality of dimensions, and does not refer to a feature of only one dimension. Optionally, the transmission feature is an overall transmission feature of the at least one data stream in one time window.

In a possible implementation, the transmission feature includes an uplink transmission feature. The uplink transmission feature is an overall transmission feature of at least one uplink data stream in the at least one data stream. The uplink data stream is a data stream output by the terminal, and the uplink data stream includes uplink packets. Optionally, the uplink transmission feature includes one of an uplink packet feature and an uplink stream feature, the uplink packet feature is an overall feature of uplink packets in the at least one uplink data stream, and the uplink stream feature is a statistical feature of the at least one uplink data stream.

Optionally, the uplink packet feature includes at least one of an average transmission interval of uplink packets, an average uplink payload size, a total uplink payload size, a quantity of uplink packets, a quantity of target uplink packets, a proportion of target uplink packets, and an uplink packet payload fluctuation value; and the average transmission interval of uplink packets is an average transmission interval of the uplink packets in the at least one uplink data stream in one time window, the average uplink payload size is an average payload size of target packets in at least one uplink data stream in the time window, the total uplink payload size is a total payload size of the target packets in the at least one uplink data stream in the time window, the quantity of uplink packets is a quantity of the uplink packets in the at least one uplink data stream in the time window, the quantity of target uplink packets is a quantity of the target packets in the at least one uplink data stream in the time window, the proportion of target uplink packets is a proportion of the target packets in the at least one uplink data stream in the time window, and the uplink packet payload fluctuation value is used to indicate a fluctuation status of sizes of the target packets in the at least one uplink data stream in the time window. The target packet is a packet with load. Optionally, data in the payload is service data. Optionally, the uplink packet feature further includes at least one of a first receive window fluctuation value and a first receive window size average. The first receive window fluctuation value is used to indicate a fluctuation status of receive window sizes carried in the uplink packets in the at least one uplink data stream in the time window. The first receive window size average is an average size of the receive windows carried in the uplink packets in the at least one uplink data stream in the time window. Optionally, the receive window is a TCP sliding window. Optionally, the first receive window fluctuation value is a standard deviation of the receive window sizes carried in the uplink packets in the at least one uplink data stream in the time window.

Optionally, the uplink stream feature includes at least one of an uplink terminal port fluctuation value, a total quantity of uplink data streams, a quantity of target uplink data streams, a quantity of uplink data streams of each of at least one data stream type, and a quantity of uplink data streams of each of at least one transmission protocol type. The uplink terminal port fluctuation value is used to indicate a fluctuation status of output ports of the at least one uplink data stream in the terminal in the time window, that is, a fluctuation status of an output port through which an uplink data stream is transmitted and that is of the terminal in the time window. The target uplink data stream is an uplink data stream whose corresponding server input port falls within a target port range. Optionally, the uplink terminal port fluctuation value is a variance of port identifiers of the output ports of the at least one uplink data stream. The total quantity of uplink data streams is a total quantity of the at least one uplink data stream, and the quantity of target uplink data streams is a total quantity of target uplink data streams in the at least one uplink data stream. The at least one data stream type includes a data stream, a broadcast data stream, and a unicast data stream. The at least one transmission protocol type includes a TCP, a UDP, and an ICMP. The target port range may be provided based on an actual requirement. For example, the target port range is a well-known port range. The target port range is not specifically limited in this embodiment of this application.

In a possible implementation, the transmission feature further includes at least one of a total quantity of the at least one data stream and a downlink transmission feature. The downlink transmission feature is an overall transmission feature of at least one downlink data stream in the at least one data stream. The downlink data stream is a data stream input by the terminal and includes downlink packets. Optionally, the downlink transmission feature includes at least one of a downlink packet feature and a downlink stream feature; and the downlink packet feature is an overall feature of downlink packets in the at least one downlink data stream, and the downlink stream feature is a statistical feature of the at least one downlink data stream.

Optionally, the downlink packet feature includes at least one of an average transmission interval of downlink packets, an average downlink payload size, a total downlink payload size, a quantity of downlink packets, a quantity of target downlink packets, a proportion of target downlink packets, and a downlink packet payload fluctuation value; and the average transmission interval of downlink packets is an average transmission interval of the downlink packets in the at least one downlink data stream in one time window, the average downlink payload size is an average payload size of target packets in at least one downlink data stream in the time window, the total downlink payload size is a total payload size of the target packets in the at least one downlink data stream in the time window, the quantity of downlink packets is a quantity of the downlink packets in the at least one downlink data stream in the time window, the quantity of target downlink packets is a quantity of the target packets in the at least one downlink data stream in the time window, the proportion of target downlink packets is a proportion of the target packets in the at least one downlink data stream in the time window, and the downlink packet payload fluctuation value is used to indicate a fluctuation status of sizes of the target packets in the at least one downlink data stream in the time window. Optionally, the downlink packet feature further includes at least one of a second receive window fluctuation value and a second receive window size average. The second receive window fluctuation value is used to indicate a fluctuation status of receive window sizes carried in the downlink packets in the at least one downlink data stream. The second receive window size average is an average size of the receive windows carried in the downlink packets in the at least one downlink data stream in the time window. Optionally, the second receive window fluctuation value is a standard deviation of receive window sizes carried in the downlink packets in the at least one downlink data stream in the time window.

Optionally, the downlink stream feature includes a downlink terminal port fluctuation value, a total quantity of downlink data streams, a quantity of target downlink data streams, a quantity of downlink data streams of each of at least one data stream type, and a quantity of downlink data streams of each of at least one transmission protocol type. The downlink terminal port fluctuation value is used to indicate a fluctuation status of input ports of the at least one downlink data stream in the terminal in the time window, that is, a fluctuation status of an input port through which a downlink data stream is transmitted and that is of the terminal in the time window. The downlink target data stream is a downlink data stream whose corresponding server output port falls within a target port range. Optionally, the downlink terminal port fluctuation value is a variance of port identifiers of the input ports of the at least one downlink data stream in the terminal in the time window. The total quantity of downlink data streams is a total quantity of the at least one downlink data stream, and the quantity of target downlink data streams is a total quantity of target downlink data streams in the at least one downlink data stream.

After obtaining the transmission feature obtaining instruction, the any network device obtains the at least one network address (for example, an IP address of the at least one second terminal) corresponding to the target terminal type from the transmission feature obtaining instruction, and the any network device determines, in any time window of a plurality of time windows, based on any network address in the at least one network address and a data stream transmitted by a second terminal indicated by the any network address, one transmission feature of the second terminal, so that the any network device can obtain one transmission feature of the at least one second terminal in the any time window, and the any network device can obtain the plurality of transmission features of the at least one second terminal in the plurality of time windows.

A manner in which the any network device determines, in the any time window, based on any network address in the at least one network address and a data stream transmitted by a second terminal indicated by the any network address, one transmission feature of the second terminal, includes Manner 1 or Manner 2.

Manner 1: The any network device determines, in the any time window, based on each data stream transmitted by the second terminal, one transmission feature of the second terminal.

The any network device first obtains a stream transmission feature of each data stream, and then obtains one transmission feature of the second terminal based on obtained at least one stream transmission feature. In a possible implementation, Manner 1 may be implemented by using step A to step C.

Step A: The any network device determines, in the any time window, based on the any network address, at least one third data stream transmitted by the second terminal indicated by the network address.

All packets in the at least one third data stream are wide area network packets. In the any time window, if any packet input by the any network device carries the any network address, the network device determines that a data stream to which the any packet belongs is a data stream transmitted by the second terminal; and the any network device determines, by comparing a destination IP address and a source IP address of the any packet, whether the any packet is a wide area network packet, and if the any packet is the wide area network packet, the any network device determines that the data stream to which the any packet belongs is one third data stream transmitted by the second terminal.

Step B: The any network device obtains a stream transmission feature of each third data stream in the at least one third data stream, where a stream transmission feature of one third data stream includes transmission features of the third data stream.

A stream transmission feature of one data stream includes at least one of transmission information of the data stream, a data stream type, a target port type, and a packet feature. The transmission information is used to indicate at least one of a transmission attribute of the data stream, and the transmission information includes source address information (a source IP address and/or a source MAC address), a source port identifier, destination address information (a destination IP address and/or a destination MAC address), a destination port identifier, and a transmission protocol type of the data stream. Optionally, the transmission information further includes at least one of a direction identifier and an identifier of the time window; and the direction identifier is used to indicate a transmission direction of the data stream.

The target port type is a port type of a port that transmits the data stream in the server. Port types of the port are classified into a first port type, a second port type, and a third port type. Optionally, a port range corresponding to the first port type is a well-known port range [0,1024), a port range corresponding to the second port type is a registered port range [1024, 49152), and a port range corresponding to the third port type is a private port range [49152, +∞). It should be noted that, the port ranges corresponding to the first port type, the second port type, and the third port type may all be provided based on a specific implementation scenario. For example, if the user configures, based on a service requirement, a port corresponding to a service to be in [10001, 20000), a port range corresponding to the first port type is [0,10001), a port range corresponding to the second port type is [10001,20000), and a port range corresponding to the third port type is [20000, +∞). Herein, the port ranges corresponding to the first port type, the second port type, and the third port type are not specifically limited in this embodiment of this application.

The packet feature is a feature of packets in the data stream. Optionally, the packet feature includes at least one of a sum of packet transmission intervals, a payload size, a sum of payload squares, a quantity of target packets, a total quantity of packets, a receive window fluctuation value, a total window size, and a sum of window squares; and the sum of packet transmission intervals is a total duration of transmission intervals between the packets in the data stream in one time window, the payload size is a total payload size of target packets in the data stream in the time window, the sum of payload squares is a sum of squares of payload sizes of the target packets, the quantity of target packets is a total quantity of the target packets in the packets in the time window, the total quantity of packets is a total quantity of the packets in the data stream in the time window, the receive window fluctuation value is used to indicate a fluctuation status of receive window sizes carried in the packets in the data stream in the time window, the total window size is a sum of the receive window sizes carried in the packets in the data stream in the time window, and the sum of window squares is a sum of squares of sizes of sliding windows.

For any third data stream in the at least one third data stream, the any network device obtains at least one of transmission information, a data stream type, a target port type, or a packet feature of the any third data stream, and determines the obtained information as stream transmission feature of the any third data stream.

A process in which the any network device obtains the transmission information of the any third data stream is the same as the process in which the any network device obtains the transmission information of the at least one data stream in step 304. Details about the process in which the any network device obtains the transmission information of the any third data stream are not described in this embodiment of this application.

A process in which the any network device obtains the data stream type of the any third data stream is as follows: The any network device determines based on a source IP address and a destination IP address that are carried in any packet in the any third data stream, whether the any third data stream is a broadcast data stream or a multicast data stream, and if the any third data stream is neither a broadcast data stream nor a multicast data stream, the any network device determines that the any third data stream is a unicast data stream.

A process in which the any network device obtains the target port type of the any third data stream is as follows: The any network device obtains a port identifier of a server in the any packet, and determines a port type to which the port identifier of the server belongs as the target port type. The port identifier of the server is a source port identifier or a destination port identifier of the any packet.

A process in which the any network device obtains the packet feature of the any third data stream is as follows: The any network device records, in the any time window, a first time at which the $1^{st}$ packet of the any third data stream is transmitted and a second time at which the last packet of the any third data stream is transmitted, and determines a time difference between the second time and the first time as the sum of packet transmission intervals; the any network device collects statistics on a total payload size of target packets in the any third data stream in the any time window, and determines the total payload size as the payload size; in the any time window, each time one target packet of the any third data stream is transmitted, the any network device calculates a square of a payload size of the target packet, so that the any network device can obtain a square of a payload size of at least one target packet in the any time window, and the any network device performs summation on the square of the payload size of the at least one target packet, to obtain the sum of payload squares; the any network device collects statistics on a total quantity of the target packets in the any third data stream in the any time window, to obtain the quantity of target packets; the any network device collects statistics on a total quantity of packets in the any third data stream in the any time window, to obtain the total quantity of packets; the any network device performs, in the any time window, summation on receive window sizes carried in the packets in the any third data stream, to obtain a total window size; the any network device enables, in the any time window, the receive window sizes carried in the packets in the any third data stream to be squared, and performs summation on the squares of the receive window sizes carried in the packets, to obtain the sum of window squares; the any network device obtains, based on the total window size and the sum of window squares, a standard deviation of the receive window sizes carried in the packets, and determines the standard deviation as the receive window fluctuation value; and the any network device determines at least one of the sum of packet transmission intervals, the payload size, the sum of payload squares, the quantity of target packets, the total quantity of packets, the receive window fluctuation value, the total window size, and the sum of window squares as the packet feature.

For example, the at least one third data stream includes a data stream a to a data stream e. IP addresses of terminals for transmitting the data stream a to the data stream e are respectively 192.168.1.2, 192.168.1.2, 192.168.1.5, 192.168.1.5, and 192.168.1.6. Stream transmission features of the data stream a to the data stream e are shown in Table 5 below.

TABLE 5

| Stream identifier | Source IP address | Destination IP address | Source port identifier | Destination port identifier | Transmission protocol type | Direction Identifier | At least one of a data stream type, a target port type, and a packet feature |
|---|---|---|---|---|---|---|---|
| Data stream a | 192.168.1.2 | 10.137.56.40 | 45564 | 80 | TCP | Uplink identifier | . . . |
| Data stream b | 192.168.1.2 | 10.137.56.42 | 45564 | 123 | UDP | Uplink identifier | . . . |
| Data stream c | 192.168.1.5 | 10.137.56.42 | 45564 | 80 | TCP | Uplink identifier | . . . |

TABLE 5-continued

| Stream identifier | Source IP address | Destination IP address | Source port identifier | Destination port identifier | Transmission protocol type | Direction Identifier | At least one of a data stream type, a target port type, and a packet feature |
|---|---|---|---|---|---|---|---|
| Data stream d | 192.168.1.5 | 10.137.56.42 | 45564 | 123 | UDP | Uplink identifier | ... |
| Data stream e | 10.137.56.42 | 192.168.1.6 | 80 | 45567 | TCP | Downlink identifier | ... |

Step C: The any network device obtains one transmission feature of the second terminal based on the stream transmission feature of the at least one third data stream. This step C is implemented by a process shown in step C1 to step C3 described below.

Step C1: The any network device obtains an uplink transmission feature based on a stream transmission feature of at least one uplink data stream in the at least one third data stream.

The any network device obtains at least one of an uplink packet feature and an uplink stream feature of the at least one uplink data stream based on the stream transmission feature of the at least one uplink data stream (briefly referred to as "at least one stream transmission feature"), and determines at least one of the obtained uplink packet feature and the obtained uplink stream feature as the uplink transmission feature.

A process in which the any network device obtains the uplink packet feature based on the at least one stream transmission feature is as follows: The any network device performs summation on sums of packet transmission intervals in the at least one stream transmission feature, to obtain a first sum value, where the first sum value is a sum of packet transmission intervals of uplink packets in the at least one uplink data stream; the any network device performs summation on total quantities of packets in the at least one stream transmission feature, to obtain a quantity of uplink packets; the any network device divides the first value by the quantity of uplink packets, to obtain an average transmission interval of uplink packets; the any network device performs summation on payload sizes in the at least one stream transmission feature, to obtain a total uplink payload size; the any network device performs summation on quantities of target packets in the at least one stream transmission feature, to obtain a quantity of target uplink packets; the any network device divides the quantity of target uplink packets by the quantity of uplink packets, to obtain a proportion of target uplink packets; the any network device divides the total uplink payload size by the quantity of target uplink packets, to obtain an average uplink payload size; the any network device calculates, based on the payload sizes in the at least one stream transmission feature, a standard deviation of payload sizes of the target packets in the at least one uplink data stream in the time window, and uses the standard deviation as an uplink packet payload fluctuation value; the any network device obtains an average of receive window fluctuation values in the at least one stream transmission feature, to obtain a first receive window fluctuation value; the any network device performs summation on total window sizes in the at least one stream transmission feature to obtain a second sum, where the second sum is a sum of receive window sizes carried in the uplink packets in the at least one uplink data stream in the time window; the any network device divides the second sum value by a total quantity of the receive windows carried in the uplink packets in the at least one uplink data stream, to obtain a first receive window size average; and the any network device determines at least one of the average transmission interval of uplink packets, the average uplink payload size, the total uplink payload size, the quantity of uplink packets, the quantity of target uplink packets, the proportion of target uplink packets, the uplink packet payload fluctuation value, the first receive window fluctuation value, and the first receive window size average as the uplink packet feature.

A process in which the any network device obtains the uplink stream feature based on the at least one stream transmission feature is as follows: The any network device obtains at least one source port identifier from transmission information of the at least one stream transmission feature, and the any network device calculates a variance of the at least one source port identifier and determines the variance as an uplink terminal port fluctuation value; the any network determines a total quantity of the at least one stream transmission feature as a total quantity of uplink data streams; the any network device collects statistics on a total quantity of target uplink data streams in the at least one uplink data stream, to obtain a quantity of target uplink data streams; the any network device obtains a data stream type in the at least one stream transmission feature, and collects statistics on a quantity of uplink data streams of each of the at least one data stream type based on the obtained data stream type; the any network device obtains a transmission protocol type in the at least one stream transmission feature, and collects statistics on a quantity of uplink data streams of each of the at least one transmission protocol type based on the obtained transmission protocol type; and the any network device determines at least one of the uplink terminal port fluctuation value, the total quantity of uplink data streams, the quantity of target uplink data streams, the quantity of uplink data streams of each of the at least one data stream type, and the quantity of uplink data streams of each of the at least one transmission protocol type as the uplink stream feature.

For example, the at least one uplink data stream includes a data stream 1 and a data stream 2, where the data stream 1 is a multicast data stream, and the data stream 2 is a broadcast data stream. However, at least one data stream type includes a multicast data stream, a broadcast data stream, and a unicast data stream. In this case, quantities of uplink data streams of the at least one data stream type are respectively 1, 1, and 0. For example, the at least one uplink data stream includes a data stream 1 and a data stream 2, a transmission protocol type of the data stream 1 is TCP, and a transmission protocol type of the data stream 2 is UDP. However, the at least one transmission protocol type includes TCP, UDP, and ICMP. In this case, quantities of uplink data streams in the at least one transmission protocol type are respectively 1, 1, and 0.

Step C2: The any network device obtains a downlink transmission feature based on a stream transmission feature of at least one downlink data stream in the at least one third data stream.

The process shown in Step C2 is the same as that shown in step C1, and details of step C2 are not described in this embodiment of this application.

Step C3: The any network device determines the uplink transmission feature and the downlink transmission feature as one transmission feature of the second terminal.

In a possible implementation, the any network device determines the uplink transmission feature as one transmission feature of the second terminal. In another possible implementation, the any network device determines the uplink transmission feature, the downlink transmission feature, and a total quantity of the at least one third data stream as one transmission feature of the second terminal.

Table 5 is used as an example. Because source IP addresses of a data stream a and a data stream b in Table 5 are the same, the data stream a and the data stream b are data streams output by a same second terminal. The any network device obtains one transmission feature of the second terminal based on stream transmission features of the data stream a and the data stream b in Table 5. If source IP addresses of a data stream c and a data stream d are the same, the data stream c and the data stream d are data streams output by a same second terminal. The any network device obtains one transmission feature of the second terminal based on stream transmission features of the data stream c and the data stream d in Table 5. The any network device obtains, based on a stream transmission feature of a data stream e in Table 5, one transmission feature of a second terminal indicated by a destination IP address of the data stream e, and finally obtains transmission features of three second terminals shown in Table 6.

TABLE 6

| IP address | Total quantity of the at least third data stream | Uplink packet feature | Uplink stream feature | Downlink packet feature | Downlink stream feature |
|---|---|---|---|---|---|
| 192.168.1.2 | 2 | . . . | . . . | 0 | 0 |
| 192.168.1.5 | 2 | . . . | . . . | 0 | 0 |
| 192.168.1.6 | 1 | 0 | 0 | . . . | . . . |

Figure 7:
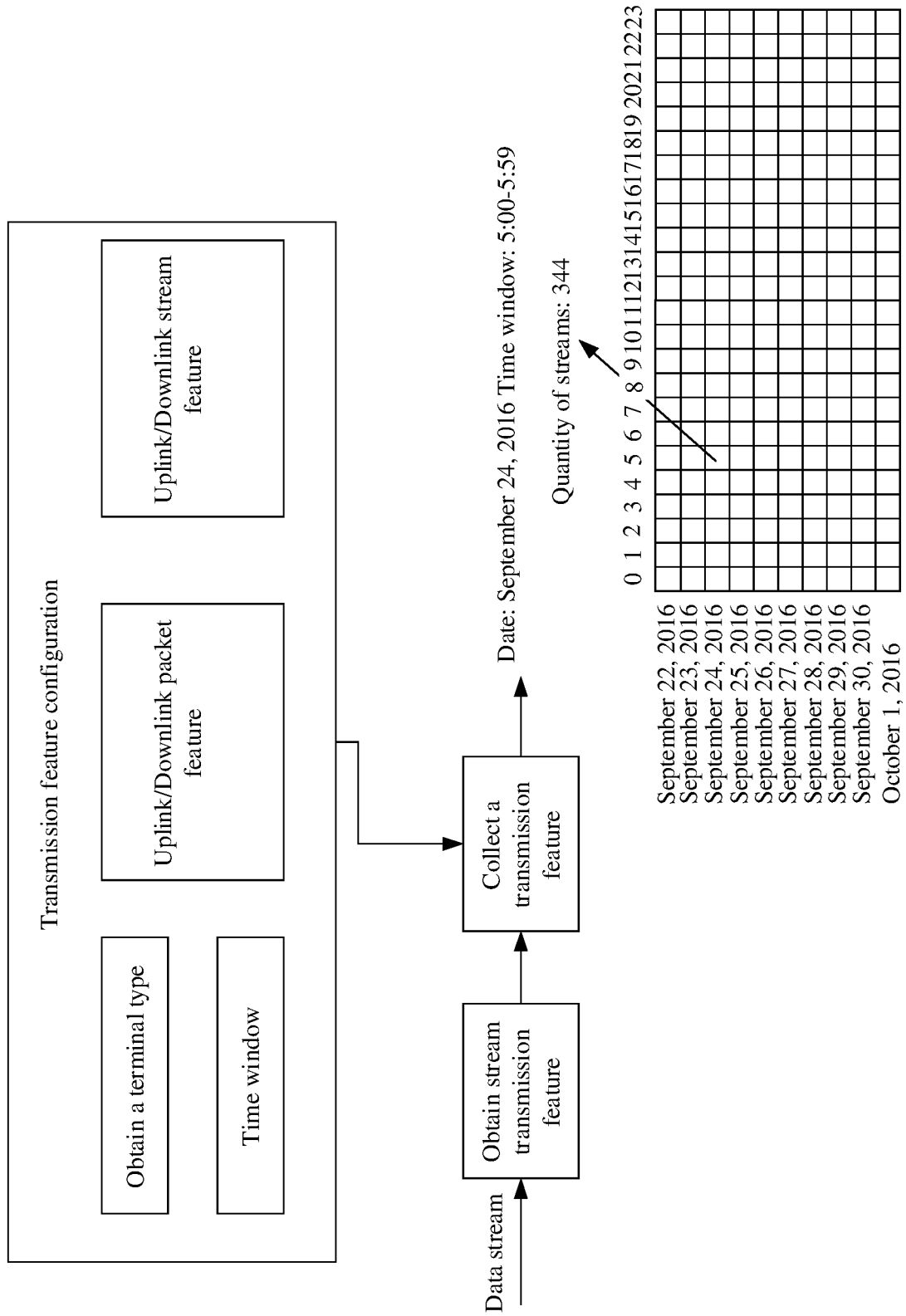
FIG. 7 is a schematic diagram of obtaining a transmission feature according to an embodiment of this application.

To further describe the process shown in Manner 1 described in the foregoing, reference is made to a schematic diagram of obtaining a transmission feature according to an embodiment of this application shown in FIG. 7. A target duration of one time window in FIG. 7 is one hour. Each day from Sep. 22, 2016 to Oct. 12, 2016 is divided into 24 time windows. The any network device obtains one transmission feature of the second terminal in each time window. When the any network device inputs, in each time window, any third data stream transmitted by the second terminal, the any network device obtains a stream transmission feature of the any third data stream, and then the any network device obtains one transmission feature of the second terminal based on the stream transmission feature of the at least one third data stream transmitted in each time window, and may further obtain a terminal type of the second terminal. For example, the any network device inputs, in a time window between 5:00 and 5:59 on Sep. 24, 2016, a total of 344 third data streams transmitted by the second terminal. In this case, the any network device collects one transmission feature of the second terminal, for example, an uplink/downlink packet feature or an uplink/downlink stream feature, in the time window based on stream transmission features of the 344 third data streams, and configures the collected transmission feature. It should be noted that, in the foregoing example, one hour is used as one time window to collect statistics on transmission features. In some other embodiments, one minute is used as a time window to collect statistics on a transmission feature of every minute in real time. A window duration (that is, the target duration) of the time window may be provided based on a specific implementation scenario. Herein, the window duration of the time window is not specifically limited in this embodiment of this application.

Manner 2: In the any time window, the any network device determines one transmission feature of the second terminal based on the at least one network address.

The any network device obtains, in any time window, at least one of an uplink packet feature of a plurality of uplink packets that carry the at least one network address and an uplink stream feature of uplink data streams in which the plurality of uplink packets are located. The any network device determines the at least one of the obtained uplink packet feature and the obtained uplink stream feature as the uplink transmission feature.

A process in which the any network device obtains, in any time window, the uplink packet feature of the plurality of uplink packets that carry the at least one network address is as follows: The any network device collects statistics on a total quantity of the plurality of uplink packets that carry the at least one network address in the any time window, to obtain a quantity of uplink packets; the any network device records an arrival time of the 1st packet and an arrival time of the last packet in the plurality of uplink packets in the any time window, and divides a time difference between the two arrival times by a target difference, to obtain an average transmission interval of uplink packets, where the $1^{st}$ packet is an uplink packet that carries any one of the at least one network address and that is the first one to reach the any network device in the any time window, the last packet is an uplink packet that carries any one of the at least one network address and that is the last one to reach the any network device in the any time window, and the target difference is a difference between the quantity of uplink packets and 1; the any network device collects statistics on a quantity of target packets that carry the at least one network address in the any time window, to obtain a quantity of target uplink packets; the any network device divides the quantity of target uplink packets by the quantity of uplink packets, to obtain a proportion of target uplink packets; the any network device collects statistics on a total payload size of the target packets that carry the at least one network address in the any time window, to obtain a total uplink payload size, and the any network device divides the total uplink payload size by the quantity of target uplink packets, to obtain an average uplink payload size; the any network device collects statistics on payload sizes of a plurality of target packets that carry the at least one network address in the any time window, calculates a standard deviation of the payload sizes of the plurality of target packets, and determines the standard deviation as an uplink packet payload fluctuation value; the any network device obtains a standard deviation of receive window sizes carried in the uplink packets that carry the at least one network address, to obtain a first receive window fluctuation value; the any network device performs summation on the receive window sizes carried in the plurality of uplink packets in the time window, to obtain a first total receive window size; the any network device divides the first total receive window size by a total quantity of the receive window sizes carried in the plurality of uplink packets, to obtain a first receive window size average; and the any network device determines at least one of the average transmission interval of uplink packets, the average uplink payload size, the total uplink payload size, the quantity of uplink packets, the quantity of target uplink packets, the proportion of target uplink packets, the uplink packet payload fluctuation value, the first receive window fluctuation value, and the first receive window size average as the uplink packet feature.

A process in which the any network device obtains, in any time window, the uplink stream feature of the uplink data streams in which the plurality of uplink packets that carry the at least one network address are located is as follows: The any network device obtains, in any time window, a plurality of source port identifiers in the plurality of uplink packets that carry the at least one network address, and the any network device calculates a variance of the plurality of source port identifiers, and determines the variance as an uplink terminal port fluctuation value; the any network device collects statistics on, in the any time window, a total quantity of the uplink data streams that carry the at least one network address, to obtain a total quantity of uplink data streams; the any network device collects statistics on, in the any time window, a total quantity of target uplink data streams in the uplink data streams that carry the at least one network address, to obtain a quantity of target uplink data streams; the any network device collects statistics on, in the any time window, a quantity of uplink data streams that carry the at least one network address and that are of each of at least one data stream type, to obtain a quantity of uplink data streams of each of the at least one data stream type; the any network device collects statistics on, in the any time window, a quantity of uplink data streams that carry the at least one network address and that are of each of at least one transmission protocol type, to obtain a quantity of uplink data streams of each of the at least one transmission protocol type; and the any network device determines at least one of the uplink terminal port fluctuation value, the total quantity of uplink data streams, the quantity of target uplink data streams, the quantity of uplink data streams of each of the at least one data stream type, and the quantity of uplink data streams of each of the at least one transmission protocol type as the uplink stream feature.

The any network device may further obtain a downlink transmission feature by referring to the process of obtaining the uplink transmission feature in Manner 2, and obtain one transmission feature of the second terminal with reference to the process shown in step C3.

The any network device determines, in each of the plurality of time windows, based on Manner 1 or Manner 2 described in the foregoing, one transmission feature of a second terminal indicated by each network address, so that the any network device can obtain the plurality of transmission features of the at least one second terminal in the plurality of time windows.

505: The any network device sends the plurality of transmission features of the at least one second terminal to the control device.

506: The control device receives the plurality of transmission features of the at least one second terminal.

Because the any network device in the at least one network device sends the plurality of transmission features of the at least one second terminal to the control device, the control device can separately receive the plurality of transmission features of the at least one second terminal from the at least one network device.

507: The control device performs training by using the plurality of third transmission features of the at least one second terminal as inputs and outputs of an initial model, to obtain a target model.

The plurality of third transmission features are some of the plurality of transmission features of the at least one second terminal. One transmission feature of each second terminal is one piece of sample data, and each second terminal is a normal terminal. When a quantity of the plurality of transmission features, of the at least one second terminal, received by the control device is greater than or equal to a target quantity, it indicates that the sample data of the normal terminal is sufficient. The control device divides the plurality of received transmission features of the at least one second terminal into three parts, and respectively places the three parts into a training set, a verification set, and a test set. In other words, the training set, the verification set, and the test set all include some of the plurality of transmission features of the at least one second terminal, where each transmission feature in the training set is a third transmission feature, each transmission feature in the verification set is a fourth transmission feature, and each transmission feature in the test set is a sixth transmission feature.

Optionally, the target model is used to obtain a normal transmission feature through reconstruction. Optionally, the target model is an unsupervised deep neural network model, for example, a depth self-encoder model. The target model includes an encoder and a decoder. A transmission feature $X=[x_1, x_2, \ldots, x_n]$ is input, as an input signal of the encoder, to the encoder. The encoder learns of the input transmission feature X to obtain implicit code. The learning process is that the encoder performs dimension reduction encoding on the transmission feature X to obtain an encoding feature Z, where the encoding feature Z is input as, an input signal of the decoder, into the decoder; and the decoder re-constructs the input encoding feature Z to obtain the transmission feature X as much as possible, where optionally, the decoder performs dimension increase decoding on the encoding feature Z, and outputs a transmission feature $X''[x_1', x_2' \ldots, x_n]$, where the transmission feature X' is the transmission feature X restored by the decoder. $x_n$ is an $n_{th}$ feature included in the transmission feature X, for example, a total quantity of uplink data streams, $n$ is a total dimension of the transmission feature X or a total quantity of features in the transmission feature, n>1, and $x_n'$ is reconstructed $x_n$.

In the process of training the initial model, q times of training, a target loss function, and a preset threshold are predetermined. The target loss function is used to calculate an average difference between the transmission feature input into the model and the transmission feature output from the model. In an $i_{th}$ training process, the control device inputs the plurality of third transmission features into an $i_{th}$ model, reconstructs each of the input third transmission features by using the $i_{th}$ model, and outputs a transmission feature obtained through reconstruction by using each of the third transmission features, and the control device inputs the plurality of third transmission features and corresponding transmission features obtained through reconstruction into the target loss function, and calculates a target loss function value; if the target loss function value is greater than or equal to the preset threshold and i<q, the control device continues to perform iteration based on an optimization algorithm to update a model parameter of the $i_{th}$ model, to obtain an $(i+1)_{th}$ model, and the control device enters an $(i+1)_{th}$ training process; and if the target loss function value is less than the preset threshold, the control device ends the training, and determines the $i_{th}$ model as the target model; or if the target loss function value is greater than or equal to the preset difference value and i≥q, the control device ends the training, to prevent the control device from continuously performing iterative training when the target model cannot be trained, or if a change of the model parameter of the model between two adjacent iterations is less than a preset model parameter change value, the control device ends the training.

q≥i≥1, where when $i=1$, the $i_{th}$ model is the initial model, and when i>1, the $i_{th}$ model is an $(i-1)^{th}$ model obtained after the parameter is updated in an $(i-1)^{th}$ training process. The optimization algorithm includes a gradient descent algorithm. The target loss function is shown in Formula (1) below, where m is a total quantity of the plurality of third transmission features, $x_i^j$ is a value of an $i_{th}$ dimension in the $j_{th}$ third transmission feature, $x_i^{'j}$ is $x_i^j$ obtained through reconstruction by using the target model, n≥i≥0, and m≥j≥0

$$F(X, X') = \frac{1}{nm}\sum_{j}^{m}\sum_{i}^{n}\left(x_i^j - x_i^{'j}\right) \quad (1)$$

Optionally, in a training process, each time training is performed, the control device can further display training progress information, where the training progress information includes a current quantity of training times and a target loss function value, so that the user can obtain a training progress through the training progress information.

508: The control device inputs a plurality of fourth transmission features of a plurality of target terminals of a target terminal type into the target model, reconstructs the fourth transmission features based on the plurality of input fourth transmission features by using the target model, and outputs a plurality of fifth transmission features, where the plurality of fourth transmission features are in one-to-one correspondence with the plurality of fifth transmission features, and one fourth transmission feature is an overall transmission feature of at least one data stream transmitted by one target terminal.

The plurality of target terminals include the at least one second terminal and at least one third terminal. The at least one second terminal is a normal terminal, and the at least one third terminal is an abnormal terminal. One fifth transmission feature is a reconstructed fourth transmission feature.

In addition to the plurality of transmission features of the at least one second terminal, the verification set further includes a plurality of transmission features of the at least one third terminal, and both the transmission feature of the second terminal and the transmission feature of the third terminal in the verification set are considered as fourth transmission features. The control device obtains a plurality of fourth transmission features from the verification set, inputs the plurality of obtained fourth transmission features into the target model, and outputs a plurality of reconstructed fourth transmission features based on the plurality of input fourth transmission features by using the target model, where the plurality of fourth transmission features belong to the at least one second terminal and the at least one third terminal, the plurality of reconstructed fourth transmission features are also the plurality of fifth transmission features, and each of the fifth transmission features corresponds to one fourth transmission feature.

509: The control device obtains a target difference based on the plurality of fifth transmission features and corresponding fourth transmission features.

The control device obtains the target difference based on a difference between at least one fifth transmission feature in the plurality of fifth transmission features and a corresponding fourth transmission feature, where a difference between one fifth transmission feature and a corresponding fourth transmission feature is used to indicate a difference status between the fifth transmission feature and the corresponding fourth transmission feature, and the fourth transmission feature corresponding to the at least one fifth transmission feature is the transmission feature of the second terminal. Optionally, this step 509 is implemented by a process shown in step 5091 to step 5093 described below.

Step 5091: For any fourth transmission feature of any second terminal in the at least one second terminal, the control device obtains a difference between the any fourth transmission feature and a corresponding fifth transmission feature.

Optionally, the difference between the any fourth transmission feature and the corresponding fifth transmission feature is a mean square error (MSE) between the any fourth transmission feature and a corresponding feature in the corresponding fifth transmission feature, as shown in Formula (2), where MSE(X,X') is a mean square error between the any fourth transmission feature and a corresponding feature in the corresponding fifth transmission feature.

$$MSE(X, X') = \frac{1}{n}\sum_{i=1}^{n}(x_i - x_i')^2 \quad (2)$$

The control device performs step 5091 on each fourth transmission feature of each of the at least one second terminal, to obtain a difference between the plurality of fourth transmission features of the at least one second terminal and the corresponding fifth transmission features. In a possible implementation, the control device determines a fifth transmission feature corresponding to each fourth transmission feature of the at least one second terminal as one of the at least one fifth transmission feature. However, in another possible implementation, the control device obtains the at least one fifth transmission feature further selected from the plurality of fifth transmission features corresponding to the plurality of fourth transmission features of the at least one second terminal. For details, refer to step 5092 described below.

Step 5092: The control device determines, based on the difference between the plurality of fourth transmission features of the at least one second terminal and the corresponding fifth transmission features, the at least one fifth transmission feature from the corresponding fifth transmission features of the plurality of fourth transmission features of the at least one second terminal.

For any fourth transmission feature in the plurality of fourth transmission features of the at least one second terminal, if a difference between the any fourth transmission feature and a corresponding fifth transmission feature belongs to a target difference interval, the difference is a normal value and can be used to calculate the target difference, and the control device determines the corresponding fifth transmission feature of the any fourth transmission feature as one of the at least one fifth transmission feature.

The target difference interval includes a plurality of differences, and the plurality of differences are all normal values and can be used to calculate the target difference. The difference in the target difference interval may be provided based on a specific situation. For example, the control device determines the target difference interval by using a box line graph or by providing a quantile. For another example, the determined target difference interval is [0, 0.1]. Herein, a range of the target difference interval is not specifically limited in this embodiment of this application.

Step 5093: The control device determines the target difference based on a difference between the at least one fifth transmission feature and a corresponding fourth transmission feature.

The control device obtains the target difference based on an average or a quantile of at least one difference, where the at least one difference includes the difference between the at least one fifth transmission feature and the corresponding fourth transmission feature, and the quantile includes a median value of the at least one difference.

The control device obtains the target difference θ, as shown in Formula (3), based on the average of the at least one difference. MSE[·] is an array formed by the at least one difference, AVE(MSE [·]) is an average of the at least one difference, STD(MSE [·]) is a standard deviation of the at least one difference and is used to indicate a fluctuation status of the at least one difference, and K is a sensitivity coefficient.

$$\theta = AVE(MSE[\cdot]) + K \times STD(MSE[\cdot]) \quad (3)$$

The target model is not only used to completely reconstruct the normal transmission feature, but also used to not completely reconstruct the abnormal transmission feature. It should be noted that a specific error range is allowed when the normal transmission feature is completely reconstructed. For example, when an actual transmission feature is reconstructed by using the target model, if a difference between a transmission feature that is obtained through reconstruction and output from the target model and the actual transmission feature is less than the target difference, it indicates that the actual transmission feature is completely reconstructed by using the target model. If the actual transmission feature is a normal transmission feature, it indicates that this time of reconstruction is accurate, or if the actual transmission feature is an abnormal transmission feature, it indicates that this time of reconstruction fails. When an actual transmission feature is reconstructed by using the target model, if a difference between a transmission feature that is obtained through reconstruction and output from the target model and the actual transmission feature is greater than or equal to the target difference, it indicates that the actual transmission feature is not completely reconstructed by using the target model. If the actual transmission feature is a normal transmission feature, it indicates that this time of reconstruction fails, or if the actual transmission feature is an abnormal transmission feature, it indicates that this time of reconstruction is accurate. The at least one fourth transmission feature is the actual transmission feature, and the at least one fifth transmission feature is the transmission feature obtained through reconstruction. The normal transmission feature is a transmission feature of a normal terminal, that is, a transmission feature of the at least one second terminal. The abnormal transmission feature is a transmission feature of an abnormal terminal, that is, a transmission feature of the at least one third terminal.

The control device can further reconstruct accurate statuses of the plurality of fourth transmission features of the plurality of target terminals based on the target model, dynamically adjust a value of K, and determine the target difference by using adjusted K. In a possible implementation, the control device determines the target difference by performing r times of update processes of the value of K In a $j_{th}$ time of update process of the value of K, the control device uses $K_j$ as K and calculates a difference $\theta_j$ based on Formula (3). If the target model meets a first condition in a case of the difference $\theta_j$, the control device determines the difference $\theta_j$ as the target difference, and ends the update of the value of K. Otherwise, the control device updates $K_j$ to $K_{j+1}$ and performs a (j+1)th time of update process of the value of K by using $K_{j+1}$ as K, r≥j≥1, where $K_j$ K used in the $j_{th}$ time of update process of the value of K, and $\theta_j$ is a difference calculated based on $K_j$ and Formula (3).

The first condition includes at least one of the following items: In the case of the difference $\theta_j$, a first precision rate of the target model is greater than or equal to a first precision rate threshold, and a first recall rate of the target model is greater than or equal to a first recall rate threshold; and in the case of the difference $\theta_j$, a second precision rate of the target model is greater than or equal to a second precision threshold, and a second recall rate of the target model is greater than or equal to a second recall rate threshold. The first precision rate is precision of completely reconstructing the normal transmission feature by using the target model. The first recall rate is a probability that the normal transmission feature is completely reconstructed by using the target model. The second precision rate is precision of not completely reconstructing the abnormal transmission feature by using the target model. The second recall rate is a probability that the abnormal transmission feature is not completely reconstructed by using the target model. The first precision rate threshold, the first recall rate threshold, the second precision rate threshold, and the second recall rate threshold are not specifically limited in this embodiment of this application.

In a possible implementation, the control device obtains a quantity of normal transmission features, a first normality quantity, a second normality quantity, a quantity of abnormal transmission features, a first abnormality quantity, and a second abnormality quantity by using first labels of the plurality of fourth transmission features and second labels of the corresponding fifth transmission features. The control device determines the first precision rate and the first recall rate based on the quantity of normal transmission features, the first normality quantity, and the second normality quantity. The control device determines the second precision rate and the second recall rate based on the quantity of abnormal transmission features, the first abnormality quantity, and the second abnormality quantity.

One actual transmission feature has one first label. The first label is used to indicate whether the actual transmission feature is a normal transmission feature. If the first label is a first normality identifier, it indicates that the actual transmission feature is a normal transmission feature. If the first label is a first abnormality identifier, it indicates that the actual transmission feature is an abnormal transmission feature. The plurality of fourth transmission features are all actual transmission features, each of first labels of normal transmission features in the plurality of fourth transmission features is the first normality identifier, and each of first labels of abnormal transmission features in the plurality of fourth transmission features is the first abnormality identifier. Manners of representing the first normality identifier and the first abnormality identifier are not specifically limited in this embodiment of this application.

One transmission feature obtained through reconstruction has one second label, where the second label is used to indicate whether an actual transmission feature corresponding to the transmission feature obtained through reconstruction is a normal transmission feature. If the second label is the second normality identifier, it indicates that the actual transmission feature corresponding to the transmission feature obtained through reconstruction is a normal transmission feature, that is, a terminal to which the actual transmission feature belongs is a normal terminal. If the second label is the second abnormality identifier, it indicates that the actual transmission feature corresponding to the transmission feature obtained through reconstruction is an abnormal transmission feature, and a terminal to which the actual transmission feature belongs is an abnormal terminal. The plurality of fifth transmission features are all transmission features obtained through reconstruction. For one fifth transmission feature, if a difference between the fifth transmission feature and a corresponding fourth transmission feature is less than the difference $\theta_j$, it indicates that the corresponding fourth transmission feature of the fifth transmission feature is a normal transmission feature in the case of the difference $\theta_j$. In this case, a second label of the fifth transmission feature is the second normality identifier. Otherwise, it indicates that the corresponding fourth transmission feature of the fifth transmission feature is an abnormal transmission feature in the case of the difference $\theta_j$. In this case, a second label of the fifth transmission feature is the second abnormality identifier. Manners of representing the second normality identifier and the second abnormality identifier are not specifically limited in this embodiment of this application.

The quantity of normal transmission features is a total quantity of transmission features of the second terminal in the plurality of fourth transmission features, that is, a total quantity of normal transmission features in the plurality of fourth transmission features. The first normality quantity is a total quantity of target normal transmission features in the plurality of fourth transmission features in the case of the difference $\theta_j$, and the target normal transmission feature is a normal transmission feature that can be accurately reconstructed by using the target model in the plurality of fourth transmission features. The second normality quantity is a quantity of fifth data streams whose second labels are second normality identifiers in the case of the difference $\theta_j$.

The quantity of abnormal transmission features is a total quantity of transmission features of the third terminal in the plurality of fourth transmission features, that is, a total quantity of abnormal transmission features in the plurality of fourth transmission features. The first abnormality quantity is a total quantity of target abnormal transmission features in the plurality of fourth transmission features in the case of the difference $\theta_j$, and the target abnormal transmission feature is an abnormal transmission feature that fails to be reconstructed by using identifiers in the case of the difference.

In a possible implementation, that the control device obtains a quantity of normal transmission features, a first normality quantity, a second normality quantity, a quantity of abnormal transmission features, a first abnormality quantity, and a second abnormality quantity by using first labels of the plurality of fourth transmission features and second labels of the corresponding fifth transmission features includes: If a first label of one fourth transmission feature is the first normality identifier, the fourth transmission feature is the normal transmission feature. In this case, the control device determines a label quantity of first labels that are of the plurality of fourth transmission features and that are first normality identifiers as the quantity of normal transmission features. If a first label of one fourth transmission feature is the first normality identifier, and a second label of a fifth transmission feature corresponding to the fourth transmission feature is the second normality identifier, it indicates that the fourth transmission feature (the normal transmission feature) is accurately reconstructed by using the target model. In this case, the control device determines the fourth transmission feature as a target normal transmission feature, and the control device determines a total quantity of target normal transmission features in the plurality of fourth transmission features as the first normality quantity. The control device collects statistics on a quantity of fifth data streams whose second labels are second normality identifiers, and determines the quantity obtained through counting as the second normality quantity. If a first label of one fourth transmission feature is the first abnormality identifier, the fourth transmission feature is the abnormal transmission feature. In this case, the control device determines a label quantity of first labels that are of the plurality of fourth transmission features and that are first abnormality identifiers as the quantity of abnormal transmission features. If a first label of one fourth transmission feature is the first abnormality identifier, and a second label of a fifth transmission feature corresponding to the fourth transmission feature is the second abnormality identifier, it indicates that the fourth transmission feature (the abnormal transmission feature) fails to be reconstructed by using the target model. In this case, the control device determines the fourth transmission feature as a target abnormal transmission feature, and the control device determines a total quantity of target abnormal transmission features in the plurality of fourth transmission features as the first abnormality quantity. The control device collects statistics on a quantity of fifth data streams whose second labels are second abnormality identifiers, and determines the quantity obtained through counting as the second abnormality quantity.

In a possible implementation, that the control device determines the first precision rate and the first recall rate based on the quantity of normal transmission features, the first normality quantity, and the second normality quantity includes: The control device determines a ratio of the first normality quantity to the second normality quantity as the first precision rate, and the control device determines a ratio of the first normality quantity to the quantity of normal transmission features as the first recall rate.

In a possible implementation, that the control device determines the second precision rate and the second recall rate based on the quantity of abnormal transmission features, the first abnormality quantity, and the second abnormality quantity includes: The control device determines a ratio of the first abnormality quantity to the second abnormality quantity as the second precision rate, and the control device determines a ratio of the first abnormality quantity to the quantity of abnormal transmission features as the second recall rate.

Table 7 described below is used as an example. The verification set includes 100 fourth transmission features, where 90 fourth transmission features are normal transmission features, and 10 fourth transmission features are abnormal transmission features, that is, a quantity of normal data streams is 90, and a quantity of abnormal data streams is 10.

The control device inputs the 100 fourth transmission features into the target model, and outputs 100 fifth transmission features by using the target model. In an $r_{th}$ update process of the value of K, for any fifth transmission feature in the 100 fifth transmission features, if a difference between the any fifth transmission feature and a corresponding fourth transmission feature is less than the difference $\theta_j$, the control device marks a second label of the any fifth transmission feature as the second normality identifier, to indicate that the corresponding fourth transmission feature of the fifth transmission feature is a normal transmission feature (that is, a fourth transmission feature corresponding to a predicted fifth transmission feature is the normal transmission feature). Otherwise, the control device marks a second label of the fifth transmission feature as the second abnormality identifier, to indicate that the corresponding fourth transmission feature of the fifth transmission feature is an abnormal transmission feature (that is, a fourth transmission feature corresponding to a predicted fifth transmission feature is the abnormal transmission feature). For example, a quantity of fifth transmission features whose second labels are second normality identifiers in the 100 fifth transmission features is 88, and a quantity of fifth transmission features whose second labels are second abnormality identifiers in the 100 fifth transmission features is 12, that is, the second normality quantity is 88, and the second abnormality quantity is 12. In 88 fourth transmission features corresponding to the 88 fifth transmission features, first labels of 86 fourth transmission features are first normality identifiers, indicating that the 86 fourth transmission features are target normal transmission features. In this case, the first normality quantity is 86. However, first labels of two fourth transmission features in the 88 fourth transmission features are first abnormality identifiers, indicating that the two fourth transmission features are actually abnormal transmission features, and that a result of reconstructing the two fourth transmission features by using the target model is inaccurate in the case of the difference $\theta_j$. In 12 fourth transmission features corresponding to the 12 fifth transmission features, first labels of the eight fourth transmission features are first abnormality identifiers, indicating that the eight fourth transmission features are target abnormal transmission features. In this case, the first abnormality quantity is 8. However, first labels of four fourth transmission features in the 12 fourth transmission features are first normality identifiers, indicating that the four fourth transmission features are actually normal transmission features, and that a result of reconstructing the four fourth transmission features by using the target model is inaccurate in the case of the difference $\theta_j$. In this case, the first precision rate=the first normality quantity 86/the second normality quantity 88, the first recall rate=the first normality quantity 86/the quantity 90 of normal data streams, the second precision rate=the first abnormality quantity 8/the second abnormality quantity 12, and the second recall rate=the first abnormality quantity 8/the quantity of abnormal data streams 10. It should be noted that the predicted fifth transmission feature is also the fifth transmission feature obtained through reconstruction.

TABLE 7

| | The second label is a second normality identifier (that is, a fourth transmission feature corresponding to a predicted fifth transmission feature is a normal transmission feature) | The second label is a second abnormality identifier (that is, a fourth transmission feature corresponding to a predicted fifth transmission feature is an abnormal transmission feature) | Total |
|---|---|---|---|
| The first label is a first normality identifier (that is, a fourth transmission feature that is a normal transmission feature) | 86 (first normality quantity) | 4 | 90 (quantity of normal data streams) |
| The first label is a first abnormality identifier (that is, a fourth transmission feature that is an abnormal transmission feature) | 2 | 8 (first abnormality quantity) | 10 (quantity of abnormal data streams) |
| Total | 88 (second normality quantity) | 12 (quantity of abnormal data streams) | 100 |

It should be noted that if the first precision rate of the target model is greater than or equal to the first precision rate threshold, it indicates that a result output when the normal is transmission feature is reconstructed by using the target model in the case of the difference θj is basically accurate. If the first recall rate of the target model is greater than or equal to the first recall rate threshold, it indicates that the normal transmission feature can be completely reconstructed by using the target model with a high probability in the case of the difference $\theta_j$. Therefore, if the first precision rate of the target model is greater than or equal to the first precision rate threshold and the first recall rate of the target model is greater than or equal to the first recall rate threshold, it indicates that the target model has a function used to completely reconstruct the normal transmission feature in the case of the difference $\theta_j$. If the second precision rate of the target model is greater than or equal to the second precision rate threshold, it indicates that a result output when the abnormal transmission feature is reconstructed by using the target model in the case of the difference $\theta_j$ is basically accurate. If the second recall rate of the target model is greater than or equal to the second recall rate threshold, it indicates that the abnormal transmission feature cannot be completely reconstructed by using the target model with a large probability in the difference of $\theta_j$. Therefore, if the second precision rate of the target model is greater than or equal to the second precision rate threshold and the second recall rate of the target model is greater than or equal to the second recall rate threshold, it indicates that the target model does not have a function used to completely reconstruct the abnormal transmission feature in the case of the difference. Therefore, if the target model meets the first condition in the case of the difference $\theta_j$, it is considered that the difference $\theta_j$ is reliable, and the control device determines the difference $\theta_j$, as the target difference.

In a possible implementation, the user specifies the target difference based on experience, and the target difference does not need to be determined by using Formula (3) and an update manner.

510: The control device inputs a plurality of sixth transmission features of the plurality of target terminals of the target terminal type into the target model, reconstructs the sixth transmission features based on the plurality of input sixth transmission features, and outputs a plurality of seventh transmission features, where the plurality of sixth transmission features are in one-to-one correspondence with the plurality of seventh transmission features, and one sixth transmission feature is an overall transmission feature of at least one data stream transmitted by one target terminal.

The plurality of target terminals include the at least one second terminal and at least one third terminal. The at least one second terminal is a normal terminal, and the at least one third terminal is an abnormal terminal. One seventh transmission feature is a reconstructed sixth transmission feature.

In addition to the plurality of transmission features of the at least one second terminal, the test set further includes a plurality of transmission features of the at least one third terminal, and both the transmission feature of the second terminal and the transmission feature of the third terminal in the test set are considered as sixth transmission features. The control device obtains a plurality of sixth transmission features from the test set, inputs the plurality of obtained sixth transmission features into the target model, and outputs a plurality of reconstructed sixth transmission features based on the plurality of input sixth transmission features by using the target model, where the plurality of sixth transmission features belong to the at least one second terminal and the at least one third terminal, the plurality of reconstructed sixth transmission features are also the plurality of seventh transmission features, and each of the seventh transmission features corresponds to one sixth transmission feature.

511: The control device determines, based on a difference between the plurality of seventh transmission features and corresponding sixth transmission features, that verification of the target model succeeds.

The control device determines, based on the difference between the plurality of seventh transmission features and the corresponding sixth transmission features, whether the target model meets a second condition, and if the target model meets the second condition, the control device determines that verification of the target model succeeds; or otherwise, the control device determines that verification of the target model fails, and if the verification of the target model fails, the control device skips to perform step 507 to step 511 until verification of a finally obtained target model can succeed.

The second condition includes at least one of the following: In the case of the target difference, the first precision rate of the target model is greater than or equal to a third precision rate threshold and the first recall rate of the target model is greater than or equal to a third recall rate threshold; and in the case of the target difference, the second precision rate of the target model is greater than or equal to a fourth precision rate threshold and the second recall rate of the target model is greater than or equal to a fourth recall rate threshold. The third precision rate threshold, the third recall rate threshold, the fourth precision rate threshold, and the fourth recall rate threshold are not specifically limited in this embodiment of this application.

Calculation manners of the first precision rate, the first recall rate, the second precision rate, and the second recall rate are relatedly described in step 5093, and details are not described herein again.

It should be noted that when the verification of the target model succeeds, the control device adds the target model to a model library, and allocates a model identifier to the target model, where the model library is used to indicate a target model corresponding to at least one terminal type. Each terminal type corresponds to one target model.

The control device can further store the target model in association with the target terminal type. In a possible implementation, when the verification of the target model succeeds, the control device stores the model identifier, of the target model, in association with the target terminal type into a target model list, to facilitate querying, where the target model list is used to record the target model corresponding to the at least one terminal type. For example, if the target terminal type is a camera, and the target model corresponding to the target terminal type is a target model 3, the control device stores the camera in association with the target model 3 into the target model list shown in Table 8.

TABLE 8

| Model identifier | Terminal type |
| --- | --- |
| Target model 1 | Sounder |
| Target model 2 | ATM |
| Target model 3 | Camera |

It should be noted that in this embodiment of this application, the control device performs training to obtain the target model. However, in some other embodiments, the network device may also perform training to obtain the target model. A process in which the network device performs training is similar to the process in which the control device performs training. The process in which the network device performs training is not described in detail in this embodiment of this application.

According to the method provided in this embodiment of this application, the control device delivers network addresses corresponding to the target terminal type to at least one network device, and each network device collects, based on each delivered network address, a transmission feature of a second terminal indicated by each network address. Then, the control device performs training based on a plurality of transmission features that are of at least one second terminal and that are uploaded by each network device, to obtain the target model corresponding to the target terminal type, so as to help subsequently verify, based on the target model, whether the terminal of the target terminal type is an abnormal terminal.

Figure 8:
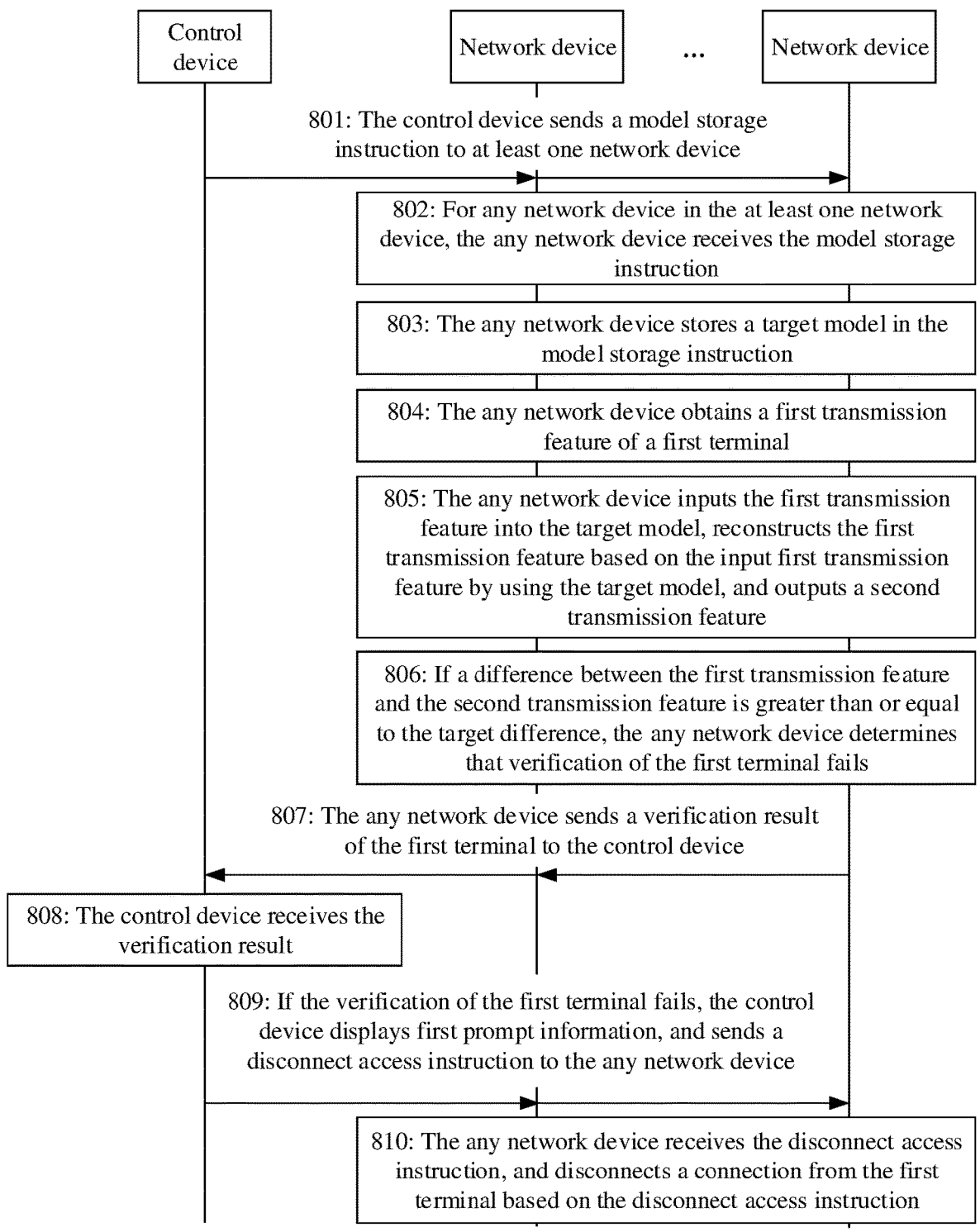
FIG. 8 is a flowchart of a method for implementing terminal verification according to an embodiment of this application.

The control device sends the target model to at least one network device, and each network device verifies a terminal of the target terminal type based on the target model. To further describe the process, reference is made to a flowchart of a method for implementing terminal verification according to this embodiment of this application shown in FIG. 8.

801: A control device sends a model storage instruction to at least one network device, where the model storage instruction is used to instruct to store a target model.

The model storage instruction includes the target model, a target terminal type, at least one network address corresponding to the target terminal type, a target difference, and a storage identifier, where the target terminal type is also a terminal type of a second terminal, the at least one network address is also a network address corresponding to the target terminal type in a configuration table, that is, a network address of at least one second terminal, and the storage identifier is used to indicate to store the target model.

In a possible implementation, a user inputs the target terminal type in a model update interface of the control device, and when the control device detects, in the model update interface, that the user performs an acknowledgment operation, the control device is triggered to perform the following operations: The control device queries, based on the target terminal type input in the model update interface, an asset table for a model identifier of a target model corresponding to the target terminal type, queries the configuration table for at least one network address corresponding to the target terminal type, and obtains, from a model library, a target model corresponding to the model identifier. In addition, the control device adds the target terminal type, the at least one network address, the target model, and the storage identifier to the model storage instruction, and sends the model storage instruction to the at least one network device.

802: For any network device in the at least one network device, the any network device receives the model storage instruction.

803: The any network device stores the target model in the model storage instruction.

The any network device stores the target model, the target terminal type, the at least one network address, and the target difference that are in the model storage instruction, in association with one another.

804: The any network device obtains a first transmission feature of a first terminal, where the first transmission feature is an overall transmission feature of at least one first data stream transmitted by the first terminal.

A terminal type of the first terminal is the target terminal type, and the first terminal is also a to-be-verified terminal of the target terminal type. A network address of the first terminal is any one of the at least one network address, that is, a network address of any one of the at least one second terminal is the same as the network address of the first terminal. The at least one first data stream carries the network address of the first terminal. The first transmission feature is also one transmission feature of the first terminal, and is also an overall transmission feature of the at least one first data stream transmitted by the first terminal in one time window.

If the first terminal is not a terminal used in a preset service, a network address of the first terminal carried in a packet transmitted by the first terminal is a network address of a second terminal. If the first terminal is a terminal used in a preset service, the first terminal is any one of the at least one second terminal. However, to verify whether the first terminal is an abnormal terminal, the any network device further needs to verify, based on the first transmission feature of the first terminal, whether the first terminal is an abnormal terminal. Therefore, the any network device further needs to obtain the first transmission feature of the first terminal.

For any network address in the at least one network address, when the any network device receives at least one data stream that carries the any network address, the any network device determines the at least one data stream as the at least one first data stream, and the any network device determines a terminal that outputs the at least one first data stream as the first terminal. The any network device determines the first transmission feature of the first terminal based on the at least one first data stream.

A process in which the any network device determines the first transmission feature of the first terminal based on the at least one first data stream is similar to the process in which the any network device determines one transmission feature of the second terminal in step 504 described in the foregoing. Herein, details about the process in which the any network device determines the first transmission feature of the first terminal based on the at least one first data stream are not described in this embodiment of this application.

805: The any network device inputs the first transmission feature into the target model, reconstructs the first transmission feature based on the input first transmission feature by using the target model, and outputs a second transmission feature.

The target model corresponds to the target terminal type, and the second transmission feature is also the reconstructed first transmission feature obtained by using the target model. The process shown in step 805 is also a process in which the any network device reconstructs the first transmission feature based on the first transmission feature, to obtain the second transmission feature.

806: If a difference between the first transmission feature and the second transmission feature is greater than or equal to the target difference, the any network device determines that verification of the first terminal fails, where the target difference is used to indicate a difference status between the first transmission feature and the second transmission feature.

The difference between the first transmission feature and the second transmission feature is a mean square error between the second transmission feature and a corresponding feature in the corresponding first transmission feature.

The any network device calculates, based on Formula (2), the mean square error between the second transmission feature and the corresponding feature in the corresponding first transmission feature, and determines the mean square error as the difference between the first transmission feature and the second transmission feature. The any network device compares the difference between the first transmission feature and the second transmission feature with the target difference, to determine whether the difference between the first transmission feature and the second transmission feature is greater than or equal to the target difference. If the difference between the first transmission feature and the second transmission feature is greater than or equal to the target difference, it indicates that the first transmission feature is not completely reconstructed by using the target model, the first transmission feature is an abnormal transmission feature, behavior of the first terminal is abnormal, and the first terminal is an abnormal terminal. In this case, the any network device determines that verification of the first terminal fails. If the difference between the first transmission feature and the second transmission feature is less than the target difference, it indicates that the first transmission feature is completely reconstructed by using the target model, the first transmission feature is a normal transmission feature, behavior of the first terminal is normal, and the first terminal is a normal terminal. In this case, the any network device determines that verification of the first terminal succeeds.

807: The any network device sends a verification result of the first terminal to the control device, where the verification result is used to indicate whether the verification of the first terminal succeeds.

The verification result includes a verification identifier and the network address of the first terminal. The verification identifier is used to indicate whether the verification of the first terminal succeeds, and the verification identifier includes a first verification identifier or a second verification identifier. The first verification identifier is used to indicate that the verification of the first terminal succeeds, and the second verification identifier is used to indicate that the verification of the first terminal fails. If the verification of the first terminal succeeds, the verification identifier is the first verification identifier, or if the verification of the first terminal fails, the verification identifier is the second verification identifier.

808: The control device receives the verification result.

809: If the verification of the first terminal fails, the control device displays first prompt information, and sends a disconnect access instruction to the any network device.

The first prompt information is used to provide a prompt indicating to the user that the verification of the first terminal fails. The first prompt information includes the second verification identifier, the network address of the first terminal, and a warning identifier. The warning identifier is used to provide the prompt indicating to the user that the verification of the first terminal fails, that is, the warning identifier is used to provide a prompt indicating to the user that the first terminal is an abnormal terminal. The disconnect access instruction is used to instruct any network device to disconnect from the first terminal. The disconnect access instruction includes the network address of the first terminal and a disconnect identifier. The disconnect identifier is used to indicate the any network device to disconnect from the first terminal.

In a possible implementation, if the verification identifier in the verification result is the second verification identifier, the control device is triggered to display the first prompt information, and send the disconnect access instruction to the any network device.

In another possible implementation, if the verification identifier in the verification result is the second verification identifier, the control device is triggered to display the first prompt information, and the user may consult the control device for the first prompt information. If the user further performs, on the control device, an operation of triggering the disconnect access instruction by the user, the control device is triggered to send the disconnect access instruction to the any network device.

If the verification of the first terminal succeeds, the control device displays second prompt information, where the second prompt information is used to provide a prompt indicating to the user that the verification of the first terminal succeeds, that is, the second prompt information is used to provide a prompt that the first terminal is a normal terminal; and the second prompt information includes an IP address of the first terminal and the first verification identifier.

810: The any network device receives the disconnect access instruction, and disconnects a connection from the first terminal based on the disconnect access instruction.

After the any network device receives the disconnect access instruction, the any network device obtains a network address from the disconnect access instruction, and disconnects a connection from a first terminal indicated by the network address.

In a possible implementation, the any network device may also display the first prompt information to indicate to the user that the verification of the first terminal fails. In a possible implementation, if the user performs, on the any network device, an operation for triggering a disconnection from the first terminal, the any network device is triggered to directly disconnect a connection from the first terminal, without waiting for the control device to deliver a disconnect access instruction.

According to the method provided in this embodiment of this application, a transmission feature of a terminal is reconstructed to verify the terminal. For example, if a difference between the transmission feature obtained through reconstruction and the transmission feature of the terminal is relatively large, it indicates that the transmission feature of the terminal is abnormal, and the terminal is an abnormal terminal. In this case, it is determined that the verification of the terminal fails. Because the terminal has a specific normal transmission feature, and the normal transmission feature is not easily spoofed, in this method, various of abnormal terminals can be accurately found through verification, thereby improving accuracy of terminal verification. In addition, because a spoofing terminal is one type of abnormal terminal, in this method, the spoofing terminal can also be accurately found through verification without using a manner in which an IP address of the terminal is simply verified, to prevent the verification of the spoofing terminal from succeeding.

Figure 9:
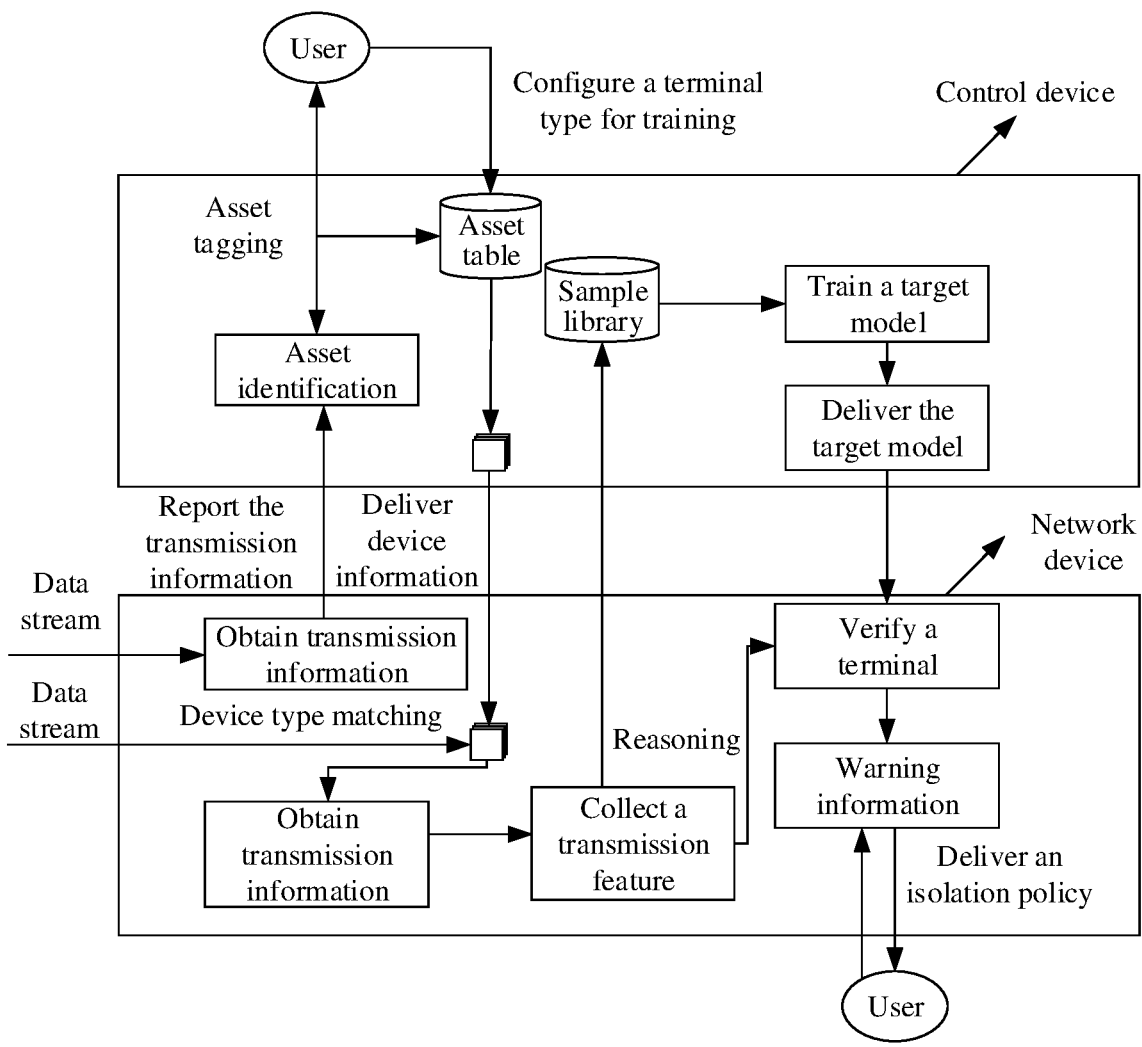
FIG. 9 is a schematic diagram of a method for implementing terminal verification according to an embodiment of this application.

To further describe the processes shown in FIG. 3, FIG. 5A and FIG. 5B, and FIG. 8, reference is made to a schematic diagram of a method for implementing terminal verification according to an embodiment of this application shown in FIG. 9. When receiving a data stream transmitted by a terminal, a network device obtains, based on packets in the data stream, transmission information of the data stream, and uploads the transmission information to a control device, so that the control device extracts a network address of the terminal in the transmission information (that is, asset identification), to implement configuration of the terminal, and a user marks a terminal type of the terminal in an asset table based on the network address of the terminal (for example, stores the network address, of the terminal, in association with the terminal type of the terminal). The control device delivers network address information (that is, device information) of a terminal corresponding to a target terminal type to the network device. The network device matches the delivered network address with at least one data stream transmitted by a terminal of a corresponding device type, and obtains a stream transmission feature of the at least one data stream, and the network device obtains a transmission feature of a corresponding terminal based on the stream transmission feature of the at least one data stream, and sends the transmission feature of the corresponding terminal to a sample library in the control device. The control device performs training based on a transmission feature of at least one terminal of the target terminal type in the sample library, to obtain a target model corresponding to the target terminal type, and delivers the target model to the network device. The network device verifies the terminal of the terminal type based on the target model, and if the verification of the terminal fails, displays warning information, that is, the first prompt information. The user delivers an isolation policy to the network device, for example, disconnects a connection from the terminal of which the verification fails. In this case, after receiving the isolation policy, the network device disconnects the connection from the terminal of which the verification fails.

Figure 10:
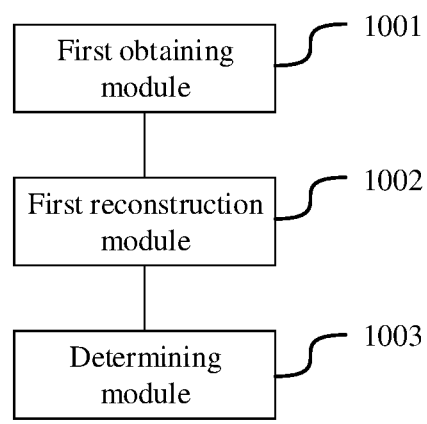
FIG. 10 is a schematic diagram of a structure of an apparatus for implementing terminal verification according to an embodiment of this application.

FIG. 10 is a schematic diagram of a structure of an apparatus for implementing terminal verification according to an embodiment of this application. The apparatus 1000 includes: a first obtaining module 1001, configured to obtain a first transmission feature of a first terminal, where the first transmission feature is an overall transmission feature of at least one first data stream transmitted by the first terminal; a first reconstruction module 1002, configured to reconstruct the first transmission feature based on the first transmission feature, to obtain a second transmission feature, where the second transmission feature is the reconstructed first transmission feature; and a determining module 1003, configured to determine, if a difference between the first transmission feature and the second transmission feature is greater than or equal to a target difference, that verification of the first terminal fails.

Optionally, the first transmission feature includes an uplink transmission feature, and the uplink transmission feature is an overall transmission feature of at least one uplink data stream in the at least one first data stream.

Optionally, the uplink transmission feature includes at least one of an uplink packet feature and an uplink stream feature; and the uplink packet feature is an overall feature of uplink packets in the at least one uplink data stream, and the uplink stream feature is a statistical feature of the at least one uplink data stream.

Optionally, the uplink packet feature includes at least one of an average transmission interval of uplink packets, an average uplink payload size, a total uplink payload size, a quantity of uplink packets, a quantity of target uplink packets, a proportion of target uplink packets, and an uplink packet payload fluctuation value; and the average transmission interval of uplink packets is an average transmission interval of the uplink packets in one time window, the average uplink payload size is an average payload size of target packets in at least one uplink data stream in the time window, the total uplink payload size is a total payload size of the target packets in the at least one uplink data stream in the time window, the quantity of uplink packets is a quantity of uplink packets in the at least one uplink data stream in the time window, the quantity of target uplink packets is a quantity of the target packets in the at least one uplink data stream in the time window, the proportion of target uplink packets is a proportion of the target packets in the at least one uplink data stream in the time window, and the uplink packet payload fluctuation value is used to indicate a fluctuation status of sizes of the target packets in the at least one uplink data stream in the time window.

The uplink stream feature includes at least one of an uplink terminal port fluctuation value, a total quantity of uplink data streams, a quantity of target uplink data streams, a quantity of uplink data streams of each of at least one data stream type, and a quantity of uplink data streams of each of at least one transmission protocol type; and the uplink terminal port fluctuation value is used to indicate a fluctuation status of output ports of the at least one uplink data stream in the first terminal in the time window, and the target uplink data stream is an uplink data stream whose corresponding server input port falls within a target port range.

Optionally, the uplink packet feature further includes at least one of a first receive window fluctuation value and a first receive window size average; and the first receive window fluctuation value is used to indicate a fluctuation status of receive window sizes carried in the uplink packets in the time window.

Optionally, the first receive window fluctuation value is a standard deviation of the receive window sizes carried in the uplink packets in the time window.

Optionally, the first transmission feature further includes at least one of a total quantity of the at least one first data stream and a downlink transmission feature; and the downlink transmission feature is an overall transmission feature of at least one downlink data stream in the at least one first data stream.

Optionally, the downlink transmission feature includes at least one of a downlink packet feature and a downlink stream feature; and the downlink packet feature is an overall feature of downlink packets in the at least one downlink data stream, and the downlink stream feature is a statistical feature of the at least one downlink data stream.

Optionally, the downlink packet feature includes at least one of an average transmission interval of downlink packets, an average downlink payload size, a total downlink payload size, a quantity of downlink packets, a quantity of target downlink packets, a proportion of target downlink packets, and a downlink packet payload fluctuation value; and the average transmission interval of downlink packets is an average transmission interval of the downlink packets in one time window, the average downlink payload size is an average payload size of target packets in at least one downlink data stream in the time window, the total downlink payload size is a total payload size of the target packets in the at least one downlink data stream in the time window, the quantity of downlink packets is a quantity of downlink packets in the at least one downlink data stream in the time window, the quantity of target downlink packets is a quantity of the target packets in the at least one downlink data stream in the time window, the proportion of target downlink packets is a proportion of the target packets in the at least one downlink data stream in the time window, and the downlink packet payload fluctuation value is used to indicate a fluctuation status of sizes of the target packets in the at least one downlink data stream in the time window.

The downlink stream feature includes at least one of a downlink terminal port fluctuation value, a total quantity of downlink data streams, a quantity of target downlink data streams, a quantity of downlink data streams of each of at least one data stream type, and a quantity of downlink data streams of each of at least one transmission protocol type; and the downlink terminal port fluctuation value is used to indicate a fluctuation status of input ports of the at least one downlink data stream in the first terminal in the time window, and the target downlink data stream is a downlink data stream whose corresponding server output port falls within a target port range.

Optionally, the downlink packet feature further includes at least one of a second receive window fluctuation value and a second receive window size average; and the second receive window fluctuation value is used to indicate a fluctuation status of receive window sizes carried in the downlink packets.

Optionally, the second receive window fluctuation value is a standard deviation of the receive window sizes carried in the downlink packets in the time window.

The first obtaining module 1001 is configured to: obtain a stream transmission feature of each of the at least one first data stream; and obtain the first transmission feature based on the stream transmission feature of the at least one first data stream.

Optionally, a stream transmission feature of one first data stream includes at least one of transmission information of the first data stream, a data stream type, a target port type, and a packet feature; and the transmission information is used to indicate a transmission attribute of a data stream, the target port type is a port type of a port that transmits the first data stream in a server, and the packet feature is a feature of a packet in the first data stream.

Optionally, the transmission information includes at least one element in a 5-tuple of the first data stream.

The packet feature includes at least one of a sum of packet transmission intervals, a payload size, a sum of payload squares, a quantity of target packets, a total quantity of packets, a receive window fluctuation value, a total window size, and a sum of window squares; and the sum of packet transmission intervals is a total duration of transmission intervals between the packets in the first data stream in one time window, the payload size is a total payload size of target packets in the first data stream in the time window, the sum of payload squares is a sum of squares of payload sizes of the target packets, the quantity of target packets is a total quantity of the target packets in the packets in the time window, the total quantity of packets is a total quantity of the packets in the time window, the receive window fluctuation value is used to indicate a fluctuation status of receive window sizes carried in the packets in the time window, the total window size is a sum of the receive window sizes carried in the packets in the time window, and the sum of window squares is a sum of squares of sizes of sliding windows.

Optionally, the transmission information further includes at least one of a direction identifier and an identifier of the time window; and the direction identifier is used to indicate a transmission direction of the first data stream.

Optionally, the first reconstruction module 1002 is configured to: input the first transmission feature into a target model, reconstruct the first transmission feature based on the input first transmission feature by using the target model, and output the second transmission feature.

Optionally, the apparatus 1000 further includes: a training module, configured to perform training by using, as inputs and outputs of an initial model, a plurality of third transmission features of at least one second terminal of a target terminal type, to obtain the target model, where the target terminal type is a terminal type of the first terminal, and one third transmission feature is an overall transmission feature of at least one data stream transmitted by one second terminal.

Optionally, the apparatus 1000 further includes: a second reconstruction module, configured to: input a plurality of fourth transmission features of a plurality of target terminals of the target terminal type into the target model, reconstruct the fourth transmission features based on the plurality of input fourth transmission features, and output a plurality of fifth transmission features, where the target terminal type is the terminal type of the first terminal, the plurality of fourth transmission features are in one-to-one correspondence with the plurality of fifth transmission features, and one fourth transmission feature is an overall transmission feature of at least one data stream transmitted by one target terminal; and a second obtaining module, configured to obtain the target difference based on the plurality of fifth transmission features and the plurality of fourth transmission features.

Optionally, the second obtaining module is configured to: obtain the target difference based on a difference between at least one of the plurality of fifth transmission features and a corresponding fourth transmission feature.

Optionally, the apparatus 1000 further includes: a third reconstruction module, configured to: input a plurality of sixth transmission features of the plurality of target terminals of the target terminal type into the target model, reconstruct the sixth transmission features based on the plurality of input sixth transmission features by using the target model, and output a plurality of seventh transmission features, where the target terminal type is the terminal type of the first terminal, the plurality of sixth transmission features are in one-to-one correspondence with the plurality of seventh transmission features, and one sixth transmission feature is an overall transmission feature of at least one data stream transmitted by one target terminal.

The determining module 1003 is further configured to determine, based on a difference between the plurality of seventh transmission features and corresponding sixth transmission features, that verification of the target model succeeds.

Optionally, the apparatus 1000 further includes: a third obtaining module, configured to obtain transmission information of at least one second data stream transmitted by the at least one second terminal, where the transmission information is used to indicate a transmission attribute of a data stream; and a storage module, configured to store the transmission information in association with the terminal type of the second terminal.

The third obtaining module is further configured to obtain, based on the transmission information associated with the terminal type, a plurality of transmission features of the at least one second terminal, where one transmission feature is an overall transmission feature of at least one data stream transmitted by a terminal.

Optionally, the apparatus 1000 further includes: a receiving module, configured to receive the target model from a control device.

Optionally, the apparatus 1000 is the control device or a network device.

According to the apparatus 1000, a transmission feature of a terminal is reconstructed to verify the terminal. For example, if a difference between the transmission feature obtained through reconstruction and the transmission feature of the terminal is relatively large, it indicates that the transmission feature of the terminal is abnormal, and the terminal is an abnormal terminal. In this case, it is determined that the verification of the terminal fails. Because the terminal has a specific normal transmission feature, and the normal transmission feature is not easily spoofed, according to the apparatus 1000, various of abnormal terminals can be accurately found through verification, thereby improving accuracy of terminal verification. In addition, because a spoofing terminal is one type of abnormal terminal, according to the apparatus 1000, the spoofing terminal can also be accurately found through verification without using a manner in which an IP address of the terminal is simply verified, to prevent the verification of the spoofing terminal from succeeding.

Figure 11:
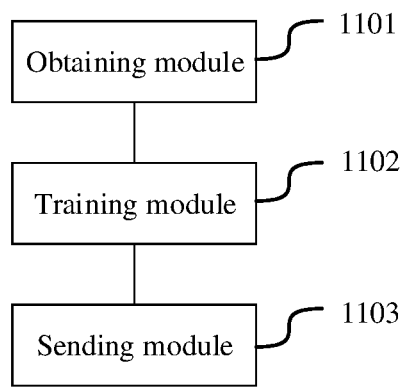
FIG. 11 is a schematic diagram of a structure of an apparatus for implementing terminal verification according to an embodiment of this application.

FIG. 11 is an apparatus for implementing terminal verification according to an embodiment of this application. The apparatus 1100 includes: an obtaining module 1101, configured to obtain a plurality of third transmission features of at least one second terminal of a target terminal type, where one third transmission feature is an overall transmission feature of at least one data stream transmitted by one second terminal; and a training module 1102, configured to perform training by using the plurality of third transmission features as inputs and outputs of an initial model to obtain a target model, where the target model is used to reconstruct a transmission feature of a to-be-verified terminal of the target terminal type, to verify the to-be-verified terminal, and the transmission feature is an overall transmission feature of at least one data stream transmitted by the to-be-verified terminal.

Optionally, the apparatus 1100 further includes: a sending module 1103, configured to send the target model to a network device.

Optionally, the apparatus 1100 further includes: a first reconstruction module, configured to: input a plurality of fourth transmission features of a plurality of target terminals of the target terminal type into the target model, reconstruct the fourth transmission features based on the plurality of input fourth transmission features, and output a plurality of fifth transmission features, where the plurality of fourth transmission features are in one-to-one correspondence with the plurality of fifth transmission features, and one fourth transmission feature is an overall transmission feature of at least one data stream transmitted by one target terminal; and a first target obtaining module, configured to obtain the target difference based on the plurality of fifth transmission features and the plurality of fourth transmission features.

Optionally, the first target obtaining module is configured to: obtain the target difference based on a difference between at least one of the plurality of fifth transmission features and a corresponding fourth transmission feature.

Optionally, the apparatus 1100 further includes: a second reconstruction module, configured to: input a plurality of sixth transmission features of the plurality of target terminals of the target terminal type into the target model, reconstruct the sixth transmission features based on the plurality of input sixth transmission features by using the target model, and output a plurality of seventh transmission features, where the plurality of sixth transmission features are in one-to-one correspondence with the plurality of seventh transmission features, and one sixth transmission feature is an overall transmission feature of at least one data stream transmitted by one target terminal; and a determining module, configured to determine, based on a difference between the plurality of seventh transmission features and corresponding sixth transmission features, that verification of the target model succeeds.

Optionally, the apparatus 1100 further includes: a second target obtaining module, configured to obtain transmission information of at least one second data stream transmitted by the at least one second terminal, where the transmission information is used to indicate a transmission attribute of a data stream; and a storage module, configured to store the transmission information in association with the terminal type of the second terminal.

The second target obtaining module is further configured to obtain, based on the transmission information associated with the terminal type, a plurality of transmission features of the at least one second terminal, where one transmission feature is an overall transmission feature of at least one data stream transmitted by a terminal.

All of the foregoing technical solutions may form optional embodiments of this disclosure through any combination. Details are not described herein again.

It should be noted that, when the apparatus for implementing terminal verification provided in the foregoing embodiment is used to verify the terminal, division of the foregoing functional modules is used only as an example for description. During actual application, the foregoing functions may be allocated to different functional modules for accomplishment according to a requirement, that is, an internal structure of the apparatus is divided into different functional modules to accomplish all or some of the functions described above. In addition, the apparatus for implementing terminal verification provided in the foregoing embodiment and the method embodiment belong to a same concept. For a specific implementation process thereof, refer to the method embodiment. Details are not described herein again.

An embodiment of this application further provides a computer program product or a computer program. The computer program product or the computer program includes a computer instruction, the computer instruction is stored in a computer-readable storage medium, a processor of an electronic device reads the computer instruction from the computer-readable storage medium, and the processor executes the computer instruction, to enable the electronic device to perform the foregoing method for implementing terminal verification.

A person of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, a compact disc, or the like.

The foregoing descriptions are merely example embodiments of this application, but are not intended to limit this application. Any modification, equivalent replacement, or improvement made without departing from the spirit and principle of this application should fall within the protection scope of this application.

What is claimed is:

1. A method for implementing terminal verification, the method comprising:

obtaining a first transmission feature of a first terminal, wherein the first transmission feature is an overall transmission feature of at least one first data stream transmitted by the first terminal, wherein the overall transmission feature is a transmission feature that is determined based on the at least one first data stream in a time window;

reconstructing the first transmission feature based on the first transmission feature to obtain a second transmission feature, wherein reconstructing the first transmission feature based on the first transmission feature to obtain the second transmission feature comprises:

inputting the first transmission feature into a target model;

reconstructing the first transmission feature based on the first transmission feature using the target model; and outputting the second transmission feature;

determining that a difference between the first transmission feature and the second transmission feature is greater than or equal to a target difference; and determining that verification of the first terminal fails in response to the difference between the first transmission feature and the second transmission feature being greater than or equal to the target difference.

2. The method according to claim 1, wherein the first transmission feature comprises an uplink transmission feature that is an overall transmission feature of at least one uplink data stream in the at least one first data stream, and the overall transmission feature of the at least one uplink data stream is a transmission feature that is determined based on the at least one uplink data stream in the time window;

wherein the uplink transmission feature comprises at least one of an uplink packet feature or an uplink stream feature;

wherein the uplink packet feature is an overall feature of uplink packets in the at least one uplink data stream that is determined based on the uplink packets in the time window; and wherein the uplink stream feature is a statistical feature of the at least one uplink data stream in the time window.

3. The method according to claim 2, wherein the uplink packet feature comprises at least one of an average transmission interval of uplink packets, an average uplink payload size, a total uplink payload size, a quantity of uplink packets, a quantity of target uplink packets, a proportion of target uplink packets, or an uplink packet payload fluctuation value;
   wherein the average transmission interval of uplink packets is an average transmission interval of the uplink packets in the time window, the average uplink payload size is an average payload size of target packets in at least one uplink data stream in the time window, the total uplink payload size is a total payload size of the target packets in the at least one uplink data stream in the time window, the quantity of uplink packets is a quantity of the uplink packets in the at least one uplink data stream in the time window, the quantity of target uplink packets is a quantity of the target packets in the at least one uplink data stream in the time window, the proportion of the target uplink packets is a proportion of the target packets in the at least one uplink data stream in the time window, and the uplink packet payload fluctuation value is used to indicate a fluctuation status of sizes of the target packets in the at least one uplink data stream in the time window;
   wherein the uplink stream feature comprises at least one of an uplink terminal port fluctuation value, a total quantity of uplink data streams, a quantity of target uplink data streams, a quantity of uplink data streams of each of at least one data stream type, and a quantity of uplink data streams of each of at least one transmission protocol type; and
   wherein the uplink terminal port fluctuation value is used to indicate a fluctuation status of output ports of the at least one uplink data stream in the first terminal in the time window and each target uplink data stream is an uplink data stream whose corresponding server input port falls within a target port range in the time window.

4. The method according to claim 3, wherein the uplink packet feature further comprises at least one of a first receive window fluctuation value and a first receive window size average; and
   wherein the first receive window fluctuation value is used to indicate a fluctuation status of receive window sizes carried in the uplink packets in the time window.

5. The method according to claim 2, wherein the first transmission feature further comprises at least one of a total quantity of the at least one first data stream or a downlink transmission feature;
   wherein the downlink transmission feature is an overall transmission feature of at least one downlink data stream in the at least one first data stream that is determined based on the at least one downlink data stream in the time window and the downlink transmission feature comprises at least one of a downlink packet feature and a downlink stream feature in the time window; and
   wherein the downlink packet feature is an overall feature of downlink packets in the at least one downlink data stream that is determined based on the at least one downlink data stream in the time window, and the downlink stream feature is a statistical feature of the at least one downlink data stream in the time window.

6. The method according to claim 5, wherein the downlink packet feature comprises at least one of an average transmission interval of downlink packets, an average downlink payload size, a total downlink payload size, a quantity of downlink packets, a quantity of target downlink packets, a proportion of target downlink packets, and a downlink packet payload fluctuation value;
   wherein the average transmission interval of downlink packets is an average transmission interval of the downlink packets in the time window, the average downlink payload size is an average payload size of target packets in at least one downlink data stream in the time window, the total downlink payload size is a total payload size of the target packets in the at least one downlink data stream in the time window, the quantity of downlink packets is a quantity of the downlink packets in the at least one downlink data stream in the time window, the quantity of target downlink packets is a quantity of the target packets in the at least one downlink data stream in the time window, the proportion of target downlink packets is a proportion of the target packets in the at least one downlink data stream in the time window, and the downlink packet payload fluctuation value is used to indicate a fluctuation status of sizes of the target packets in the at least one downlink data stream in the time window;
   wherein the downlink stream feature comprises at least one of a downlink terminal port fluctuation value, a total quantity of downlink data streams, a quantity of target downlink data streams, a quantity of downlink data streams of each of at least one data stream type, and a quantity of downlink data streams of each of at least one transmission protocol type; and
   wherein the downlink terminal port fluctuation value is used to indicate a fluctuation status of input ports of the at least one downlink data stream in the first terminal in the time window, and each target downlink data stream is a downlink data stream whose corresponding server output port falls within a target port range.

7. The method according to claim 6, wherein the downlink packet feature further comprises at least one of a second receive window fluctuation value and a second receive window size average, and wherein the second receive window fluctuation value is used to indicate a fluctuation status of receive window sizes carried in the downlink packets in the time window.

8. The method according to claim 1, wherein obtaining the first transmission feature of the first terminal comprises:
   obtaining a stream transmission feature of each of the at least one first data stream in the time window; and
   obtaining the first transmission feature based on the stream transmission feature of the at least one first data stream in the time window.

9. The method according to claim 8, wherein the stream transmission feature of the at least one first data stream comprises at least one of transmission information of the at least one first data stream, a data stream type, a target port type, and a packet feature; and
   wherein the transmission information is used to indicate a transmission attribute of a data stream, the target port type is a port type of a port that transmits the at least one first data stream in a server, and the packet feature is a feature of a packet in the at least one first data stream.

10. The method according to claim 9, wherein the transmission information comprises at least one element in a 5-tuple of the at least one first data stream;
   wherein the packet feature comprises at least one of a sum of packet transmission intervals, a payload size, a sum of payload squares, a quantity of target packets, a total quantity of packets, a receive window fluctuation value, a total window size, and a sum of window squares; and wherein the sum of packet transmission intervals is a total duration of transmission intervals between the packets in the at least one first data stream in the time window, the payload size is a total payload size of target packets in the at least one first data stream in the time window, the sum of payload squares is a sum of squares of payload sizes of the target packets, the quantity of target packets is a total quantity of the target packets in the packets in the time window, the total quantity of packets is a total quantity of the packets in the time window, the receive window fluctuation value is used to indicate a fluctuation status of receive window sizes carried in the packets in the time window, the total window size is a sum of the receive window sizes carried in the packets in the time window, and the sum of window squares is a sum of squares of sizes of sliding windows.

11. The method according to claim 1, wherein, before inputting the first transmission feature into the target model, the method further comprises:
   inputting a plurality of fourth transmission features of a plurality of target terminals of a target terminal type into the target model;
   reconstructing the fourth transmission features based on the plurality of input fourth transmission features by using the target model;
   outputting a plurality of fifth transmission features, wherein the target terminal type is a terminal type of the first terminal, the plurality of fourth transmission features are in one-to-one correspondence with the plurality of fifth transmission features, and one fourth transmission feature is an overall transmission feature of at least one data stream transmitted by one target terminal, wherein the overall transmission feature of the one fourth transmission feature is determined based on the at least one data stream transmitted by the one target terminal in the time window; and
   obtaining the target difference based on the plurality of fifth transmission features and the plurality of fourth transmission features.

12. The method according to claim 11, wherein obtaining the target difference based on the plurality of fifth transmission features and the plurality of fourth transmission features comprises obtaining the target difference based on a difference between at least one of the plurality of fifth transmission features and a corresponding fourth transmission feature.

13. The method according to claim 1, wherein, before inputting the first transmission feature into the target model, the method further comprises:
   inputting a plurality of sixth transmission features of a plurality of target terminals of a target terminal type into the target model;
   reconstructing the sixth transmission features based on the plurality of input sixth transmission features by using the target model;
   outputting a plurality of seventh transmission features, wherein the target terminal type is the terminal type of the first terminal, and the plurality of sixth transmission features are in one-to-one correspondence with the plurality of seventh transmission features, and one sixth transmission feature is an overall transmission feature of at least one data stream transmitted by one target terminal, wherein the overall transmission feature of the one sixth transmission feature is determined based on the at least one data stream transmitted by the one target terminal in the time window; and
   determining that verification of the target model succeeds based on a difference between the plurality of seventh transmission features and corresponding sixth transmission features.

14. The method according to claim 1, wherein, before inputting the first transmission feature into the target model, the method further comprises:
   obtaining transmission information of at least one second data stream transmitted by at least one second terminal, wherein the transmission information is used to indicate a transmission attribute of a data stream;
   storing the transmission information in association with a terminal type of the second terminal; and
   obtaining a plurality of transmission features of the at least one second terminal based on the transmission information associated with the terminal type, wherein each transmission feature is an overall transmission feature of at least one data stream transmitted by a corresponding terminal, and wherein each overall transmission feature is determined based on the corresponding data stream by the corresponding terminal in the time window.

15. A method for implementing terminal verification, the method comprising:
   obtaining a plurality of third transmission features of at least one second terminal of a target terminal type, wherein at least one third transmission feature is an overall transmission feature of at least one data stream transmitted by at least one second terminal, wherein the overall transmission feature is determined based on the at least one data stream transmitted by the at least one second terminal in a time window; and
   performing training by using the plurality of third transmission features as inputs and outputs of an initial model to obtain a target model, wherein the target model is used to reconstruct a transmission feature of a to-be-verified terminal of the target terminal type, to verify the to-be-verified terminal, and wherein reconstructing the transmission feature of the to-be-verified terminal comprises:
      inputting a plurality of fourth transmission features into the target model;
      reconstructing the plurality of fourth transmission features by using the target model; and
      outputting a plurality of fifth transmission features.

16. An apparatus for implementing terminal verification, the apparatus comprising:
   at least one processor; and
   at least one memory coupled to the at least one processor and configured to store instructions that, when executed by the at least one processor, cause the apparatus to:
      obtain a first transmission feature of a first terminal, wherein the first transmission feature is an overall transmission feature of at least one first data stream transmitted by the first terminal, wherein the overall transmission feature is a transmission feature that is determined based on the at least one first data stream in a time window;
      reconstruct the first transmission feature based on the first transmission feature to obtain a second transmission feature, wherein reconstructing the first transmission feature comprises:
         inputting the first transmission feature into a target model;

reconstructing the first transmission feature based on the first transmission feature by using the target model; and outputting the second transmission feature;

determine that a difference between the first transmission feature and the second transmission feature is greater than or equal to a target difference; and determine that verification of the first terminal fails in response to the difference between the first transmission feature and the second transmission feature being greater than or equal to the target difference.

17. The apparatus according to claim 16, wherein, when executed by the at least one processor, the instructions further cause the apparatus to:

input a plurality of fourth transmission features of a plurality of target terminals of a target terminal type into the target model;

reconstruct the fourth transmission features based on the plurality of input fourth transmission features;

output a plurality of fifth transmission features, wherein the target terminal type is the terminal type of the first terminal, the plurality of fourth transmission features are in one-to-one correspondence with the plurality of fifth transmission features, and one fourth transmission feature is an overall transmission feature of at least one data stream transmitted by one target terminal, wherein the overall transmission feature of the one fourth transmission feature is determined based on the at least one data stream transmitted by the one target terminal in the time window; and obtain the target difference based on the plurality of fifth transmission features and the plurality of fourth transmission features.

18. The apparatus according to claim 16, wherein, when executed by the at least one processor, the instructions further cause the apparatus to:

input a plurality of sixth transmission features of a plurality of target terminals of a target terminal type into the target model;

reconstruct the sixth transmission features based on the plurality of input sixth transmission features by using the target model;

output a plurality of seventh transmission features, wherein the target terminal type is the terminal type of the first terminal, the plurality of sixth transmission features are in one-to-one correspondence with the plurality of seventh transmission features, and one sixth transmission feature is an overall transmission feature of at least one data stream transmitted by one target terminal, wherein the overall transmission feature of the one sixth transmission feature is determined based on the at least one data stream transmitted by the one target terminal in the time window; and determine, based on a difference between the plurality of seventh transmission features and corresponding sixth transmission features, that verification of the target model succeeds.

\* \* \* \* \*